(12) United States Patent
Kanematsu et al.

(10) Patent No.: US 10,397,638 B2
(45) Date of Patent: Aug. 27, 2019

(54) INFORMATION PROCESSING APPARATUS, AND IMAGE DISPLAYING METHOD

(71) Applicant: RICOH COMPANY, Ltd., Ohta-Ku (JP)

(72) Inventors: Shoichiro Kanematsu, Kanagawa (JP); Yuichi Kawasaki, Kanagawa (JP); Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 169 days.

(21) Appl. No.: 15/564,222

(22) PCT Filed: Apr. 15, 2016

(86) PCT No.: PCT/JP2016/002066
§ 371 (c)(1),
(2) Date: Oct. 4, 2017

(87) PCT Pub. No.: WO2016/174845
PCT Pub. Date: Nov. 3, 2016

(65) Prior Publication Data
US 2018/0131991 A1 May 10, 2018

(30) Foreign Application Priority Data
Apr. 27, 2015 (JP) .................................. 2015-090237

(51) Int. Cl.
*G09G 5/00* (2006.01)
*H04N 21/431* (2011.01)
(Continued)

(52) U.S. Cl.
CPC ..... *H04N 21/4312* (2013.01); *G06F 3/03545* (2013.01); *G06F 3/042* (2013.01);
(Continued)

(58) Field of Classification Search
CPC ...... H04N 21/431; H04N 5/272; H04N 7/147; G09G 5/37; G09G 5/377; G09G 5/14;
(Continued)

(56) References Cited

U.S. PATENT DOCUMENTS

| 6,795,053 B1 | 9/2004 | Funamoto et al. |
| 2004/0201561 A1 | 10/2004 | Funamoto et al. |

(Continued)

FOREIGN PATENT DOCUMENTS

| EP | 2 071 551 A2 | 6/2009 |
| JP | H10-214075 | 8/1998 |

(Continued)

OTHER PUBLICATIONS

Extended European Search Report dated Apr. 5, 2018 in European Patent Application No. 16786124.4 citing documents AA-AD and AO therein, 11 pages.

(Continued)

*Primary Examiner* — Adam R. Giesy
(74) *Attorney, Agent, or Firm* — Xsensus LLP

(57) ABSTRACT

An information processing apparatus is for displaying a first image on a display apparatus. The information processing apparatus includes a display request detection unit configured to detect a display request to the display apparatus for displaying a second image that is different from the first image; an image acquisition unit configured to acquire an image signal of the second image from an outside; a superimposition display unit configured to superimpose and display the second image, formed by using the image signal, on the first image in a case in which the display request detection unit detects the display request; and a display mode changing unit configured to change, in a case in which the second image is superimposed and displayed on the first image, at least a display mode of the first image.

13 Claims, 20 Drawing Sheets

(51) Int. Cl.
*G09G 5/14* (2006.01)
*G06F 3/14* (2006.01)
*G09G 5/377* (2006.01)
*H04N 7/14* (2006.01)
*G06F 3/0354* (2013.01)
*G06F 3/041* (2006.01)
*G06F 3/042* (2006.01)
*G09G 5/37* (2006.01)
*H04N 5/272* (2006.01)

(52) U.S. Cl.
CPC .......... *G06F 3/0412* (2013.01); *G06F 3/1454* (2013.01); *G09G 5/14* (2013.01); *G09G 5/37* (2013.01); *G09G 5/377* (2013.01); *H04N 5/272* (2013.01); *H04N 7/147* (2013.01); *G09G 2340/06* (2013.01); *G09G 2370/02* (2013.01)

(58) Field of Classification Search
CPC ............ G09G 2340/06; G09G 2370/02; G06F 3/03545; G06F 3/0412; G06F 3/042; G06F 3/1454
See application file for complete search history.

(56) References Cited

U.S. PATENT DOCUMENTS

| | | | |
|---|---|---|---|
| 2004/0201562 A1 | 10/2004 | Funamoto et al. | |
| 2006/0114265 A1* | 6/2006 | Nishida | G09G 5/14 345/593 |
| 2007/0294634 A1* | 12/2007 | Kokemohr | G06F 3/04845 715/781 |
| 2011/0090409 A1 | 4/2011 | Kawasaki et al. | |
| 2013/0016118 A1* | 1/2013 | Mizushiro | H04N 9/3147 345/589 |
| 2015/0009278 A1 | 1/2015 | Modai et al. | |

FOREIGN PATENT DOCUMENTS

| | | |
|---|---|---|
| JP | 2004-085961 | 3/2004 |
| JP | 2008-287198 | 11/2008 |
| JP | 2011-090038 | 5/2011 |
| JP | 2015-060305 | 3/2015 |

OTHER PUBLICATIONS

International Search Report and Written Opinion dated Jul. 19, 2016 in PCT/JP2016/002066 filed on Apr. 15, 2016.

Chapter II report issued on Jan. 10, 2017, in PCT/JP2016/002066 filed on Apr. 15, 2016.

\* cited by examiner

[Fig. 1]
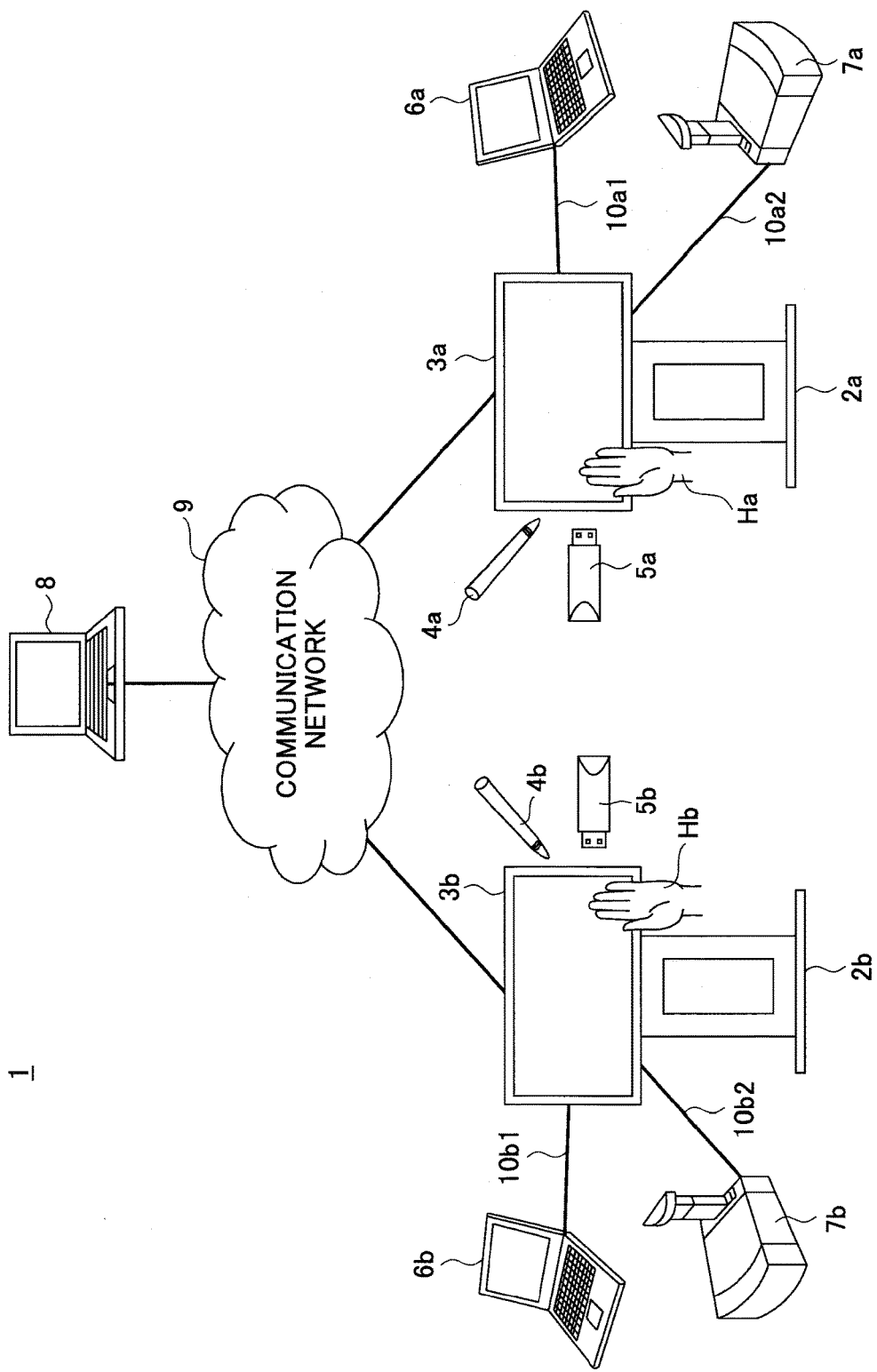

[Fig. 2]
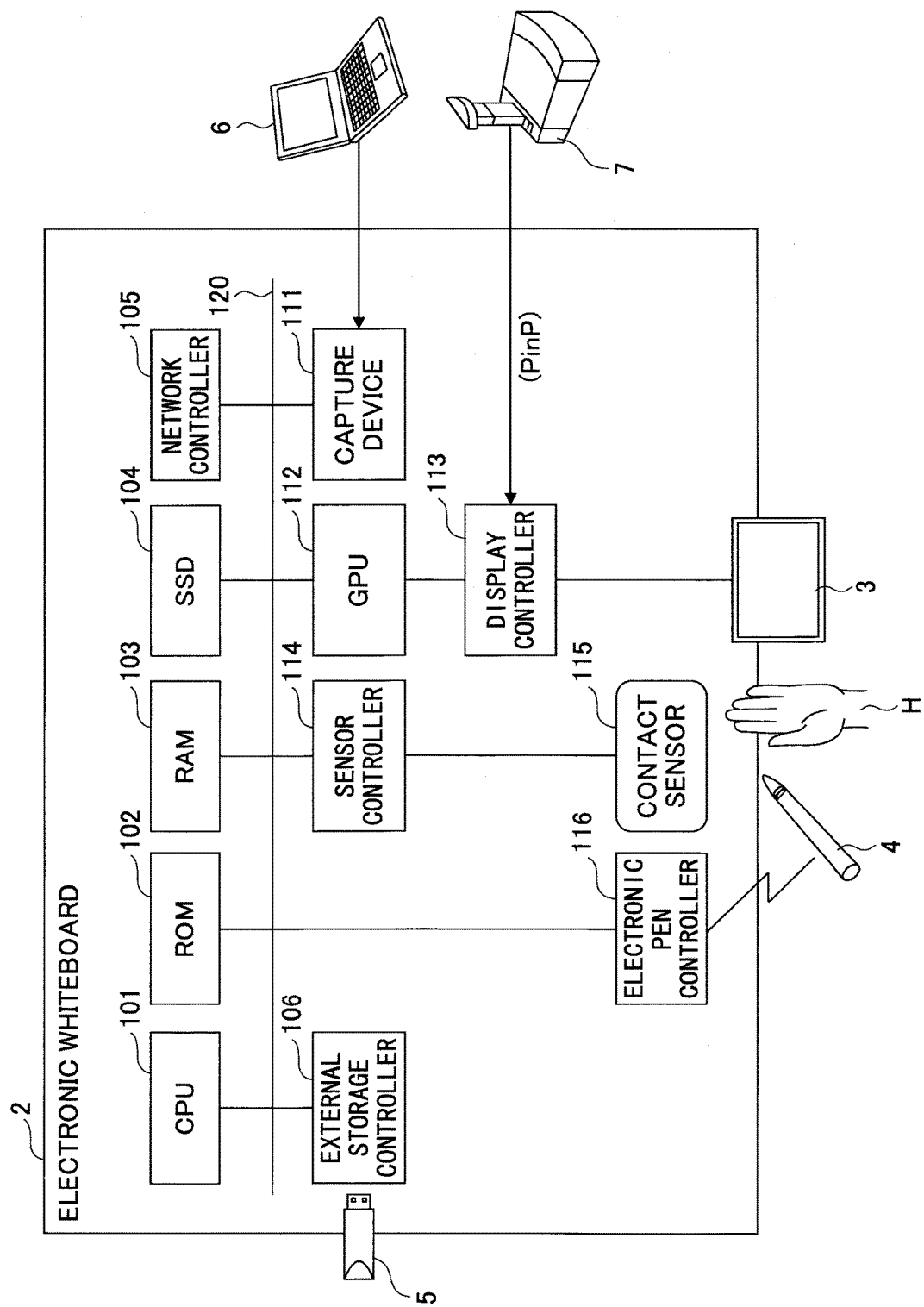

[Fig. 3]
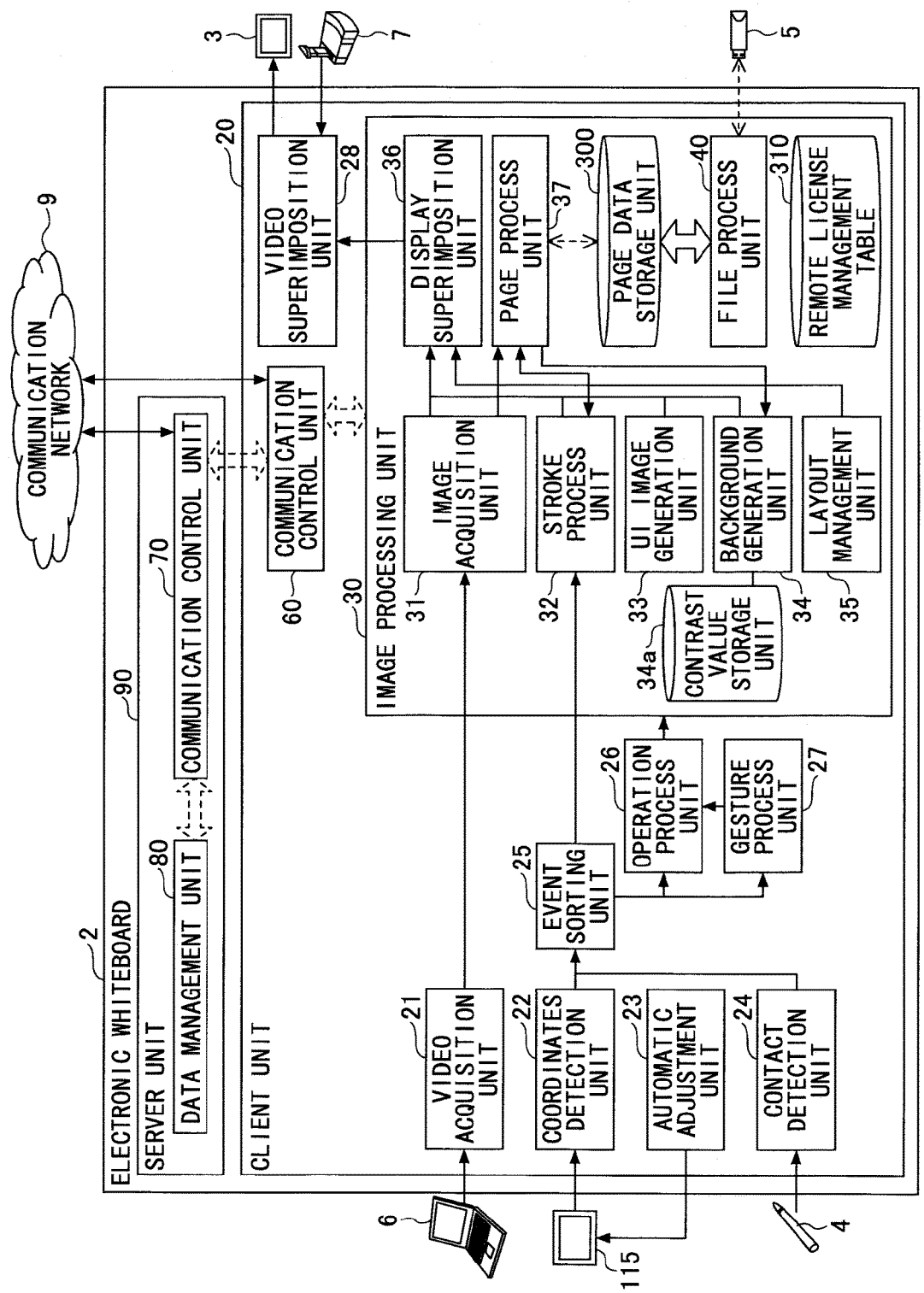

[Fig. 4]
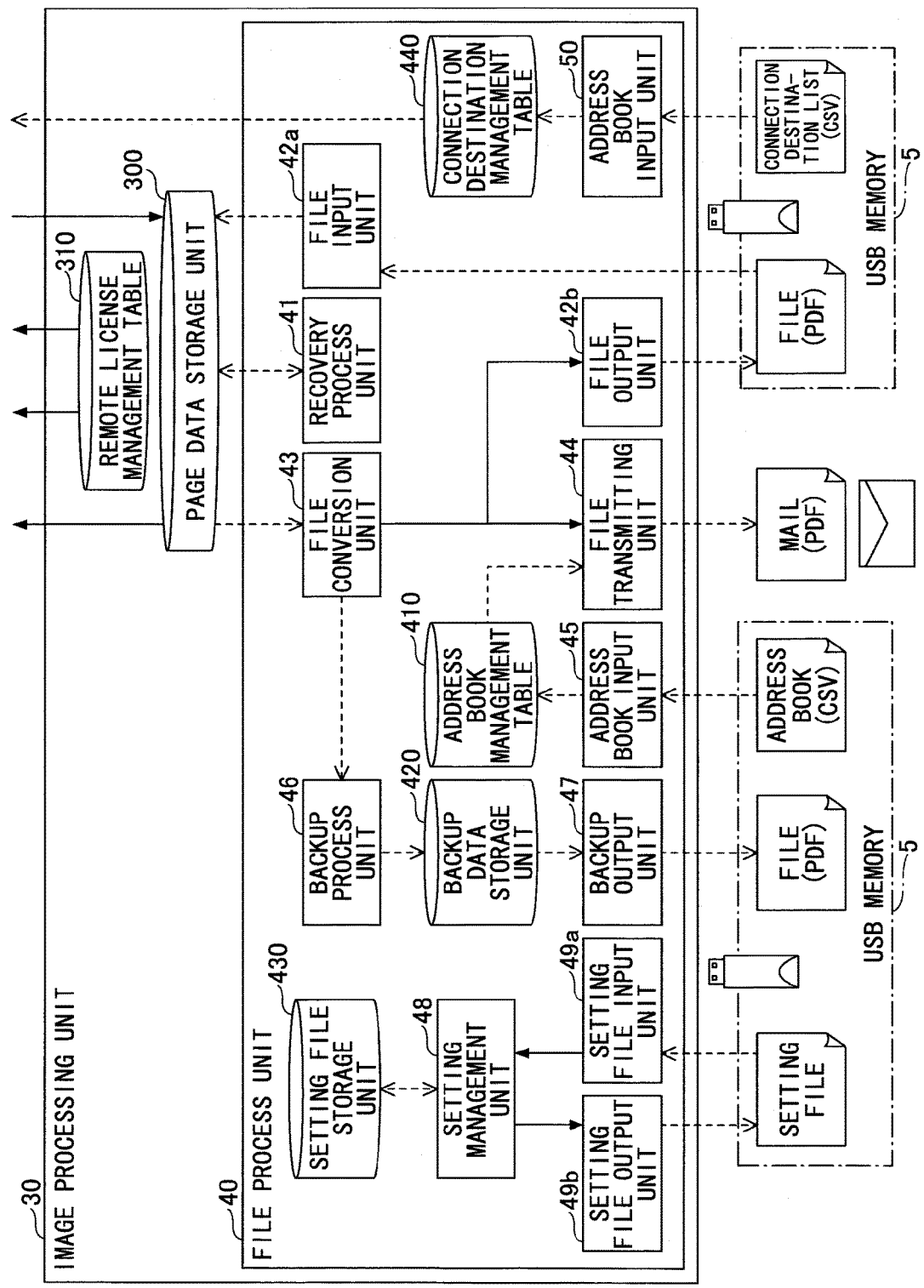

[Fig. 5]
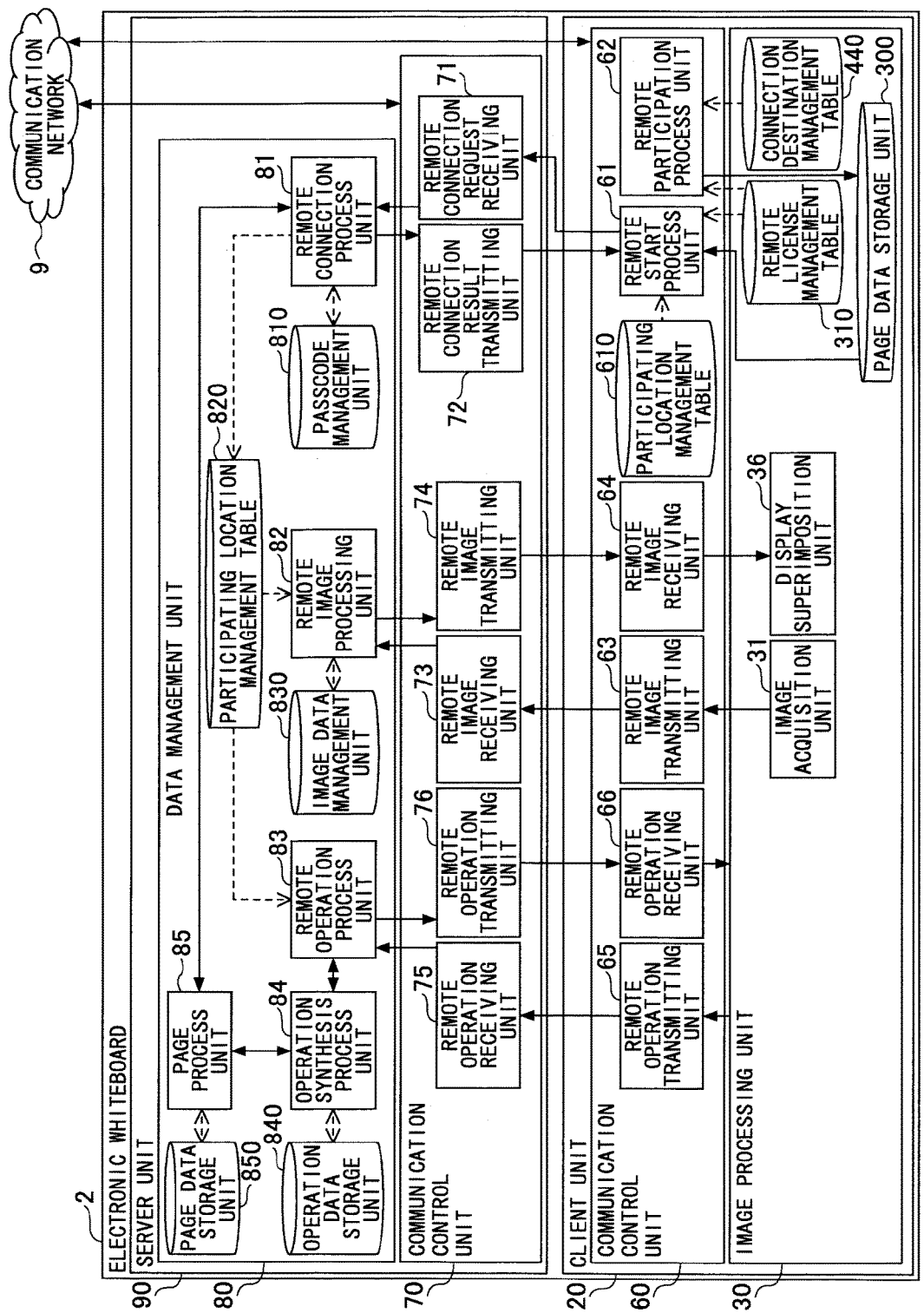

[Fig. 6]

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

[Fig. 7]
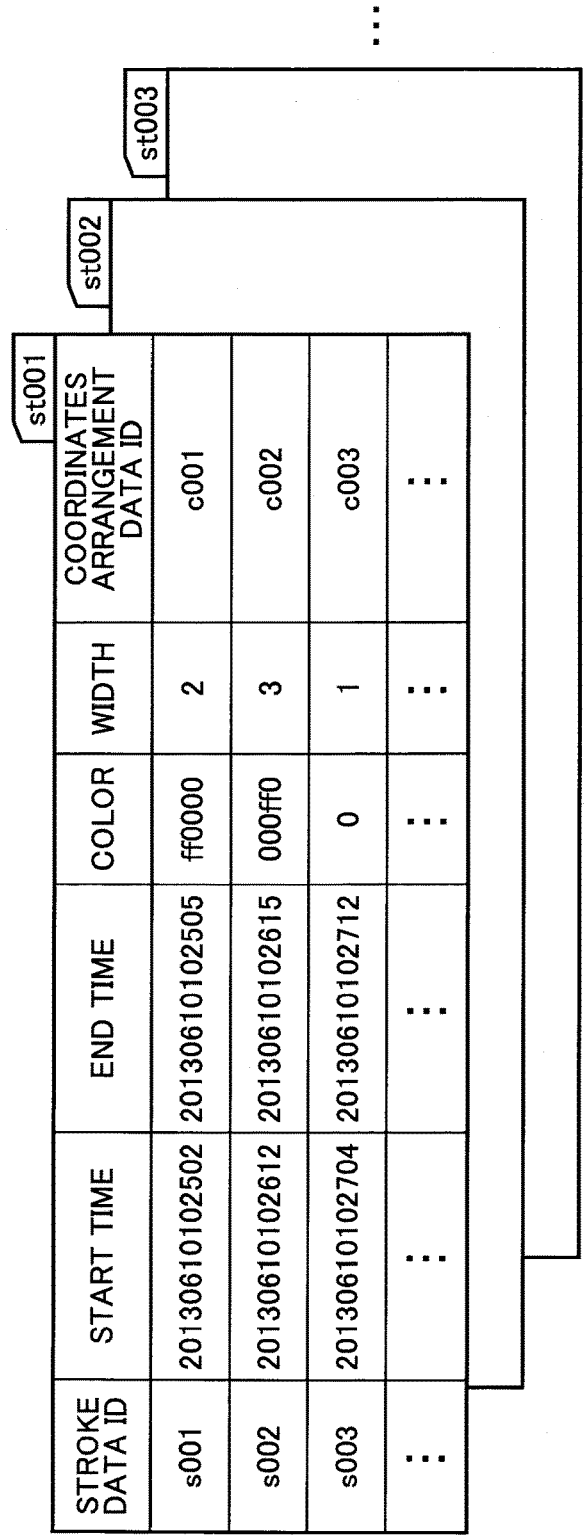

[Fig. 8]
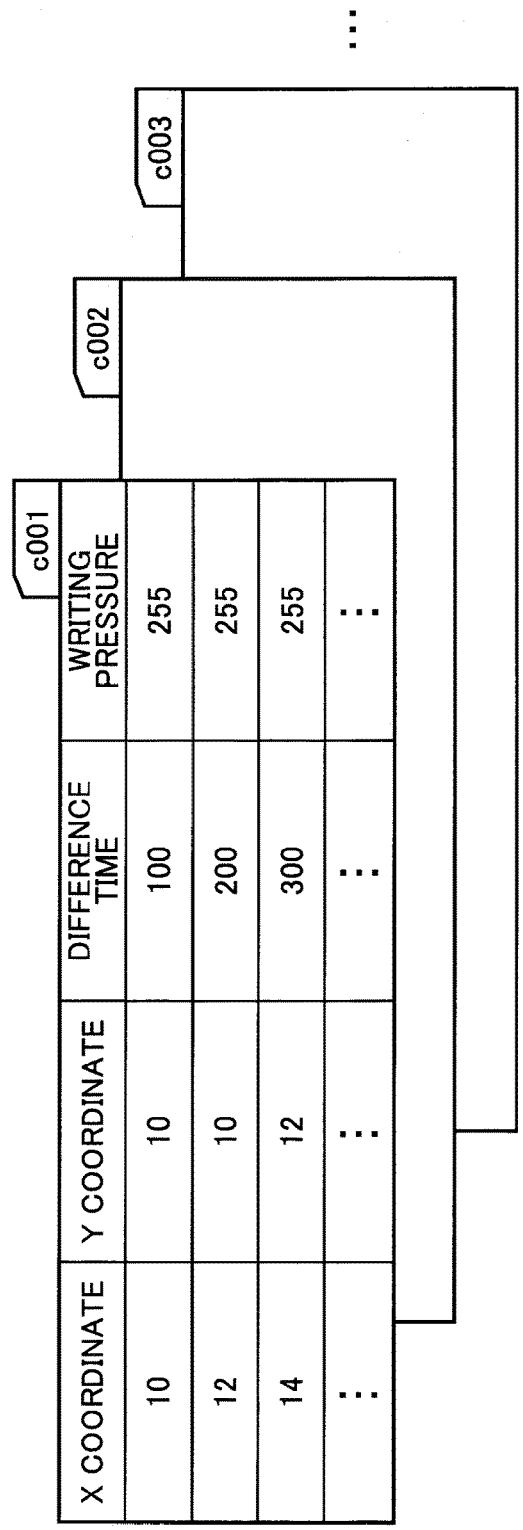

[Fig. 9]

| MEDIA DATA ID | DATA TYPE | RECORDING TIME | X COORDINATE | Y COORDINATE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

[Fig. 10]

| PRODUCT ID | LICENSE ID | EXPIRATION DATE |
|---|---|---|
| 1001 | 12345678abcdefgh | 2012/12/31 |
| 1001 | 4321dcba8765hgfe | − |
| ⋮ | ⋮ | ⋮ |

[Fig. 11]

| NAME | MAIL ADDRESS |
|---|---|
| TARO | taro@alpha.co.jp |
| HANAKO | hanako@beta.co.jp |
| − | jiro@gamma.co.jp |
| ⋮ | ⋮ |

[Fig. 12]

| |
|---|
| iwb-20130610104423.pdf |
| iwb-20130625152245.pdf |
| iwb-20130628113418.pdf |
| ⋮ |

[Fig. 13]

| NAME | IP ADDRESS |
|---|---|
| CONFERENCE ROOM 1 | 192.0.0.1 |
| CONFERENCE ROOM 2 | 192.0.0.2 |
| - | 192.0.0.3 |
| ⋮ | ⋮ |

[Fig. 14]

| NAME | IP ADDRESS |
|---|---|
| CONFERENCE ROOM 1 | 192.0.0.1 |
| CONFERENCE ROOM 2 | 192.0.0.2 |
| - | 192.0.0.8 |
| ⋮ | ⋮ |

[Fig. 15]

| SEQ | OPERATION NAME | IP ADDRESS OF TRANSMISSION SOURCE: Port No. | IP ADDRESS OF DESTINATION: Port No. | OPERATION TYPE | OPERATION OBJECT (PAGE DATA ID/ STROKE DATA ID) | DATA |
|---|---|---|---|---|---|---|
| 1 | ADD | 192.0.0.1:50001 | 192.0.0.1:50000 | STROKE | p005 | ..... (STROKE DATA) |
| 2 | ADD | 192.0.0.1:50000 | 192.0.0.2:50001 | STROKE | p005 | ..... (STROKE DATA) |
| 3 | UPDATE | 192.0.0.2:50001 | 192.0.0.1:50000 | STROKE | s006 | (50,40) |
| 4 | UPDATE | 192.0.0.1:50000 | 192.0.0.1:50001 | STROKE | s006 | (50,40) |
| 5 | DELETE | 192.0.0.2:50001 | 192.0.0.1:50000 | STROKE | s007 | — |
| 6 | DELETE | 192.0.0.1:50000 | 192.0.0.1:50001 | STROKE | s007 | — |
| 7 | ADD | 192.0.0.1:50001 | 192.0.0.1:50000 | PAGE | — | — |
| 8 | ADD | 192.0.0.1:50000 | 192.0.0.2:50001 | PAGE | — | — |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ... | ... | ... | ... | ... | ... | ... |

[Fig. 16]
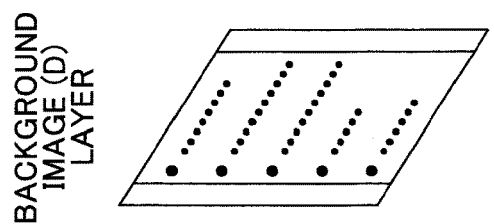
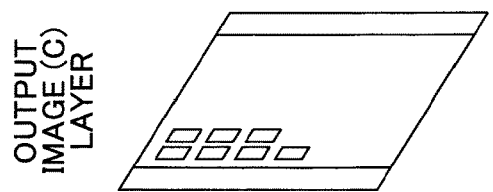
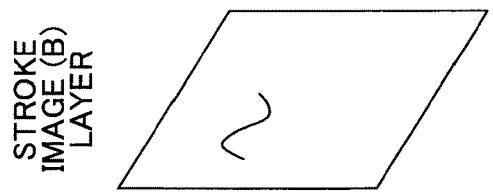
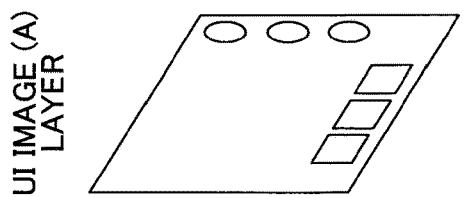
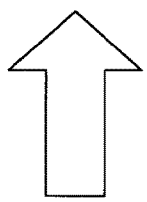

[Fig. 17]
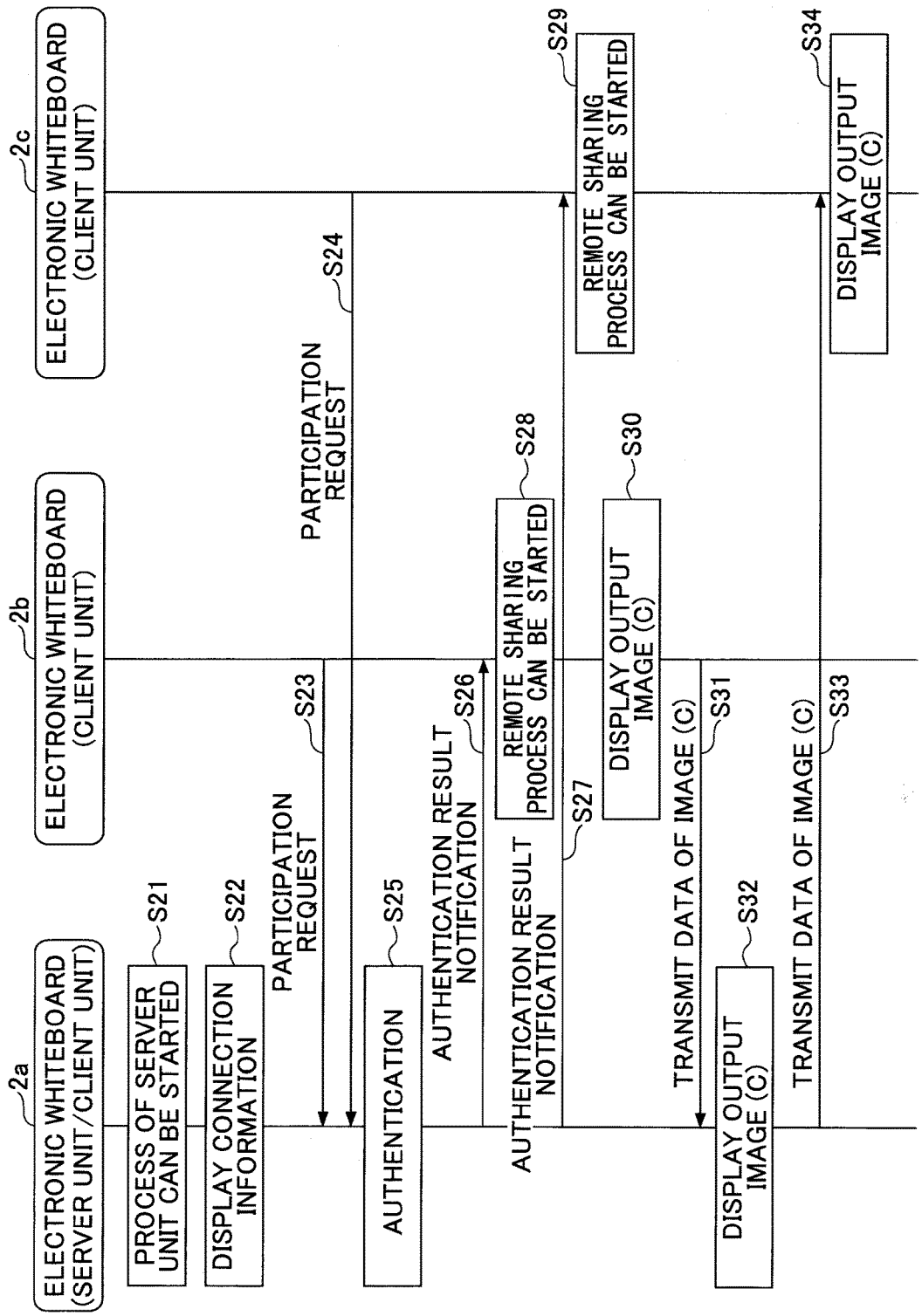

[Fig. 18]
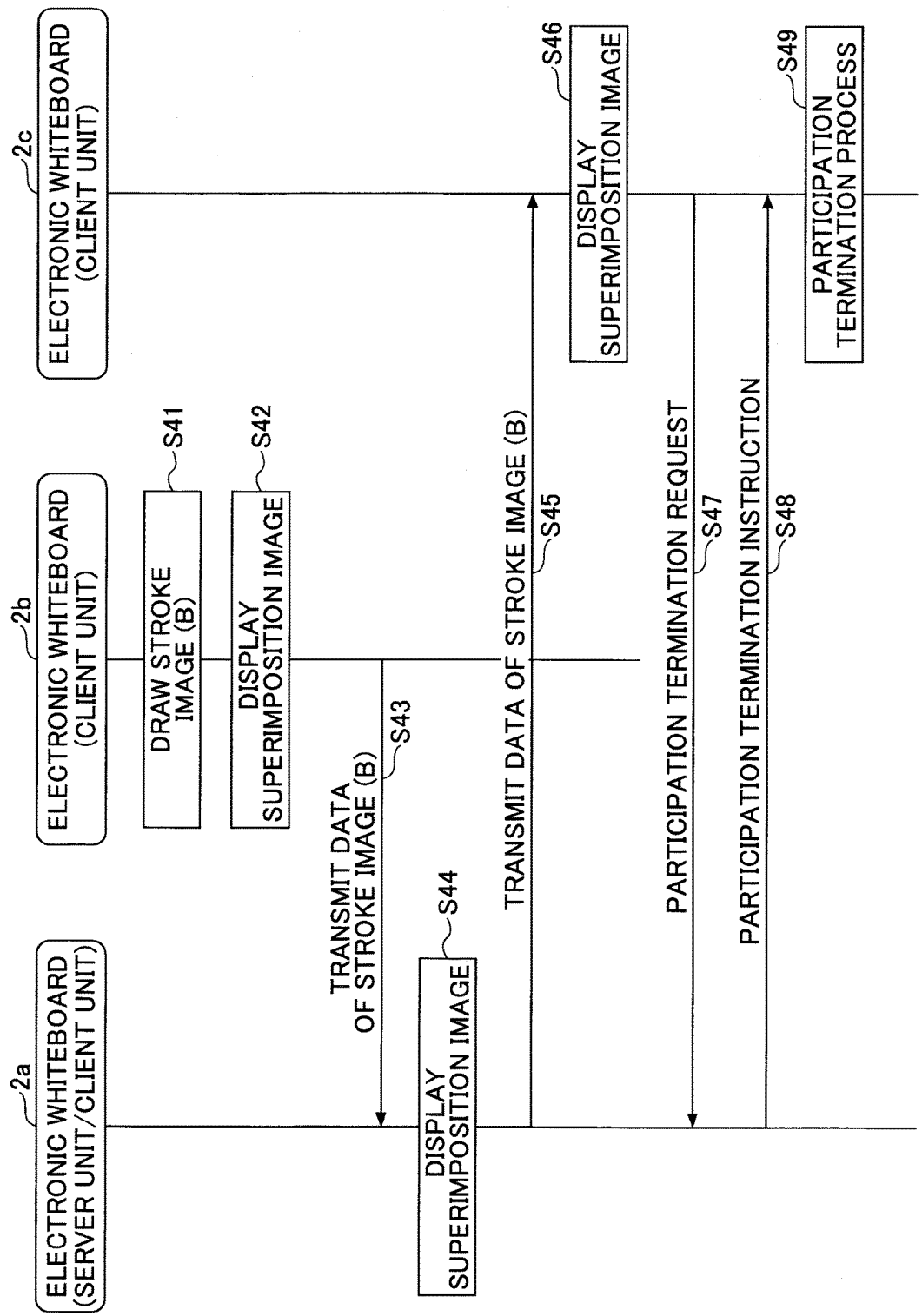

[Fig. 19A]
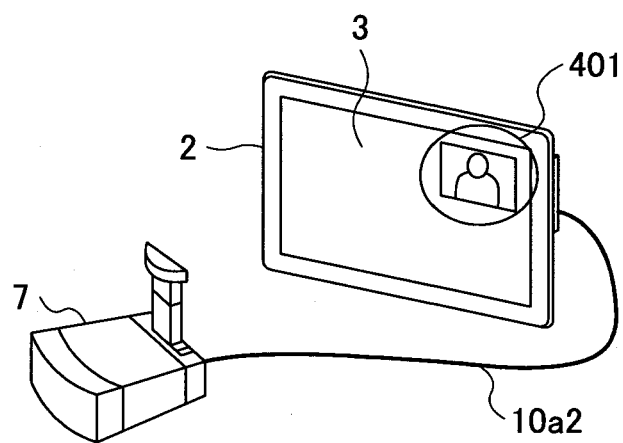
[Fig. 19B]
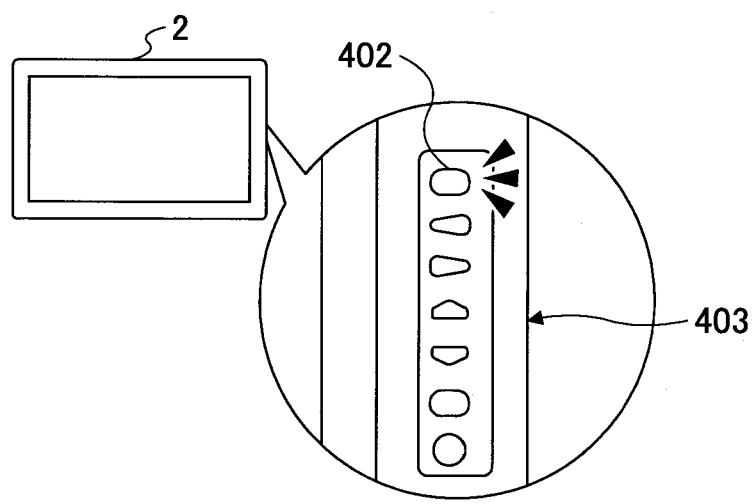

[Fig. 20]
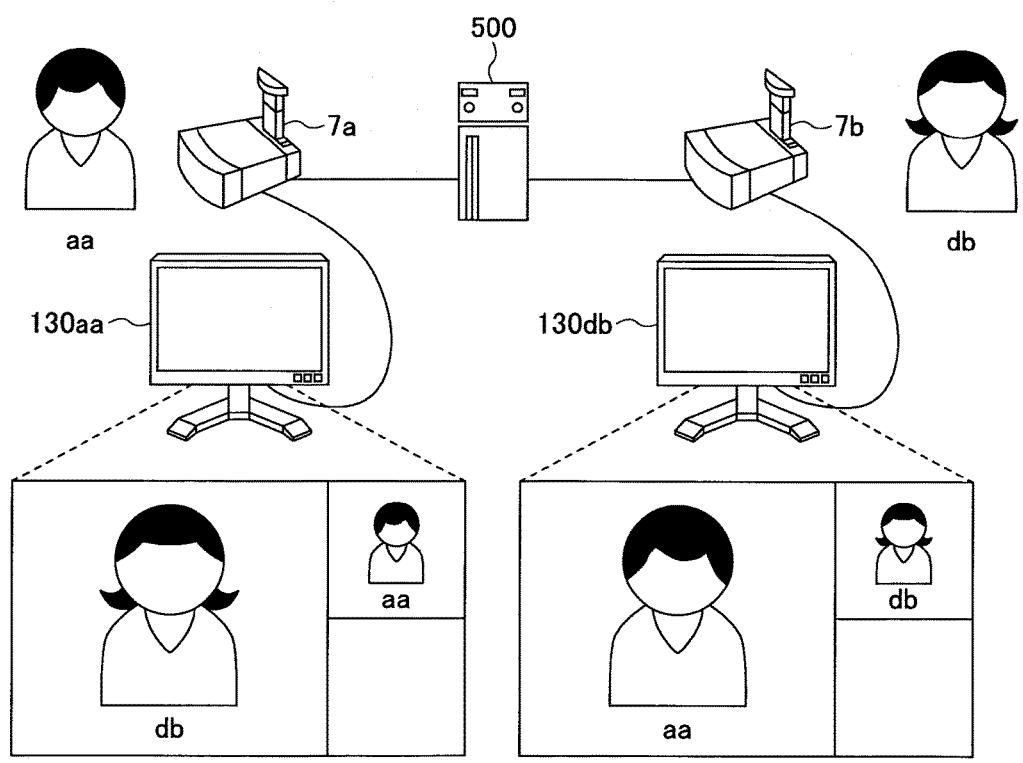

[Fig. 21]
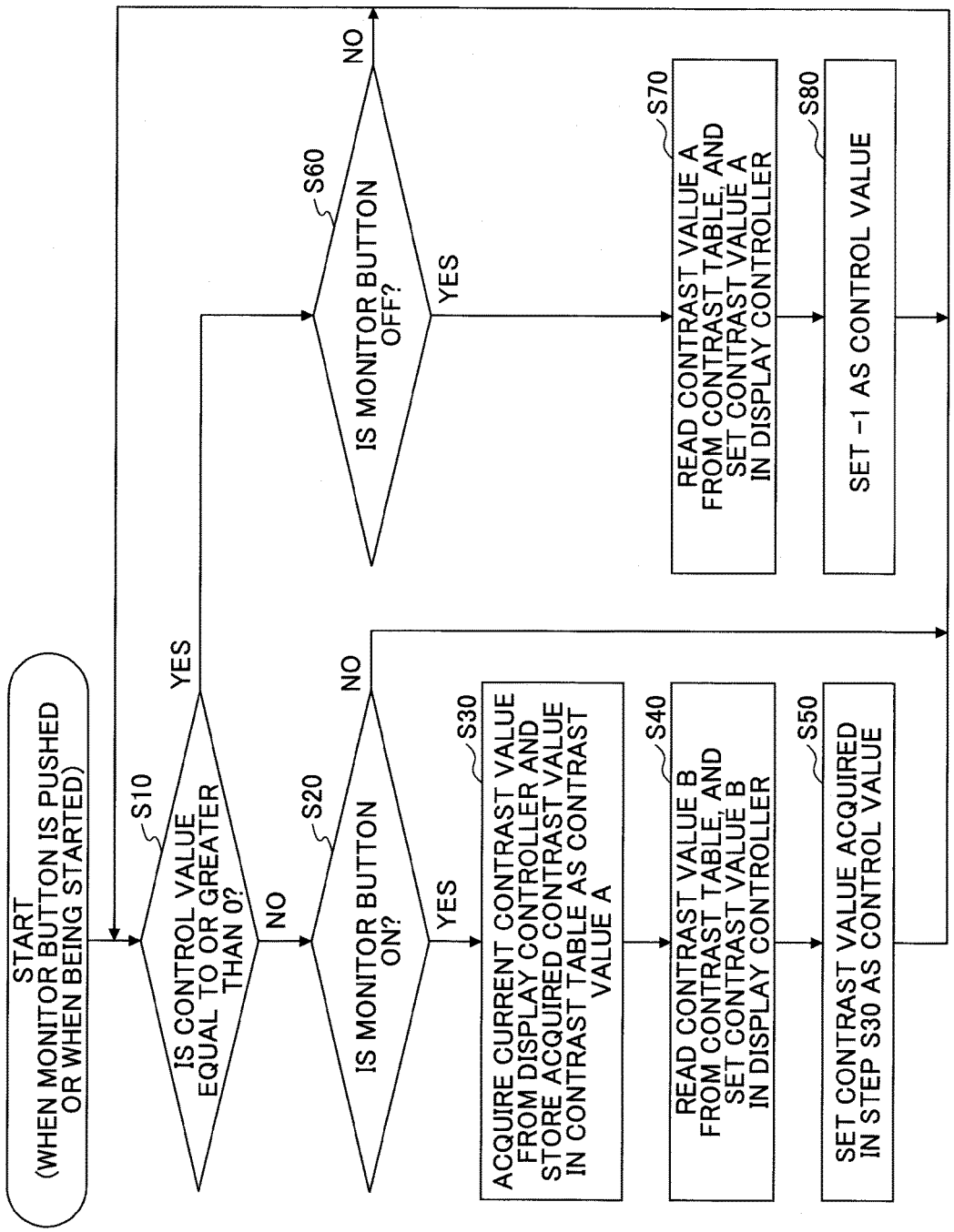

[Fig. 22]
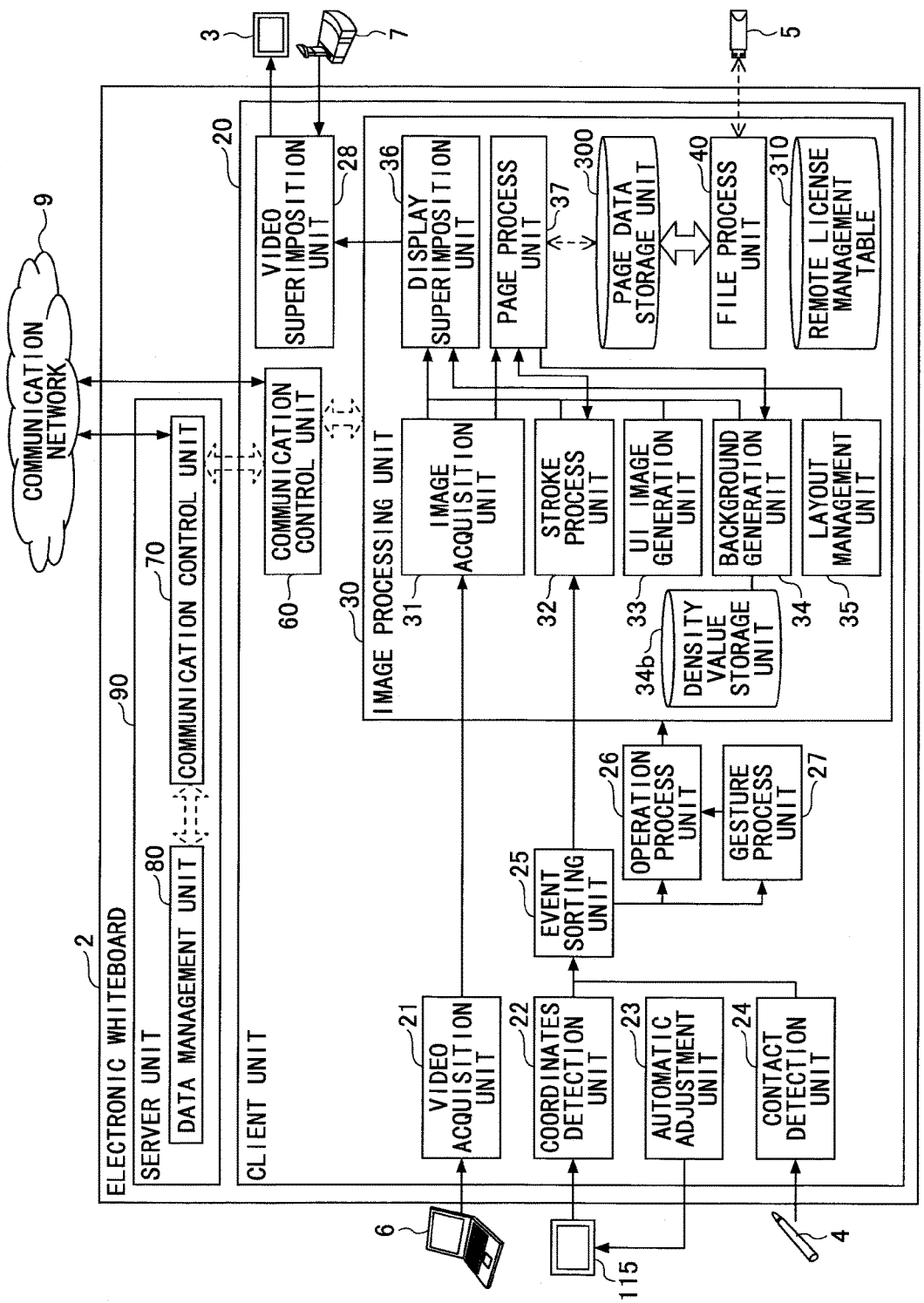

[Fig. 23]
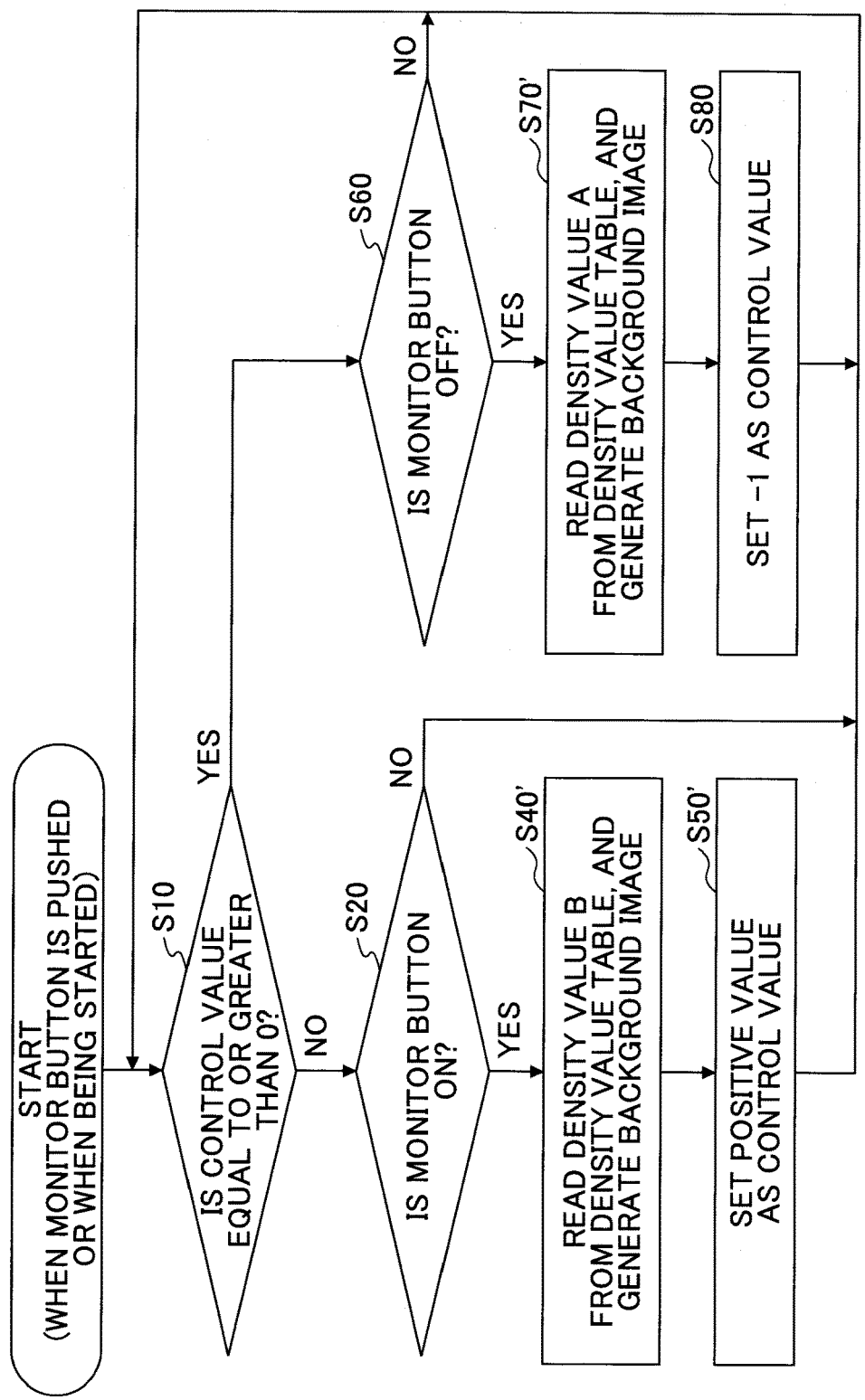

INFORMATION PROCESSING APPARATUS, AND IMAGE DISPLAYING METHOD

TECHNICAL FIELD

The disclosures herein generally relate to an information processing apparatus, and an image displaying method.

BACKGROUND ART

An electronic whiteboard having a function for taking in handwritten information written by hand on a surface of a display and a function for displaying the handwritten information is known in the related art. Contents written on the display surface of the electronic white board by a user's hand are accumulated as coordinates data, and the electronic white board draws the contents on the display as a stroke in which the coordinates are connected. Thus, similar to a conventional whiteboard, the user can draw letters, figures and the like. Further, the user can store the handwritten information and transmit the handwritten information to another electronic whiteboard via a network.

By the way, similar to a typical display, the user can adjust video settings such as a contrast and color temperature in the display contained in the electronic whiteboard such that an image on the display becomes easy to be viewed. However, for example, the video setting such as the contrast set by the user is not necessarily appropriate. PTL 1 discloses a technique in which, in order to prevent inappropriate adjustment by the user, a display stores an initial value of the video setting in advance, and the video setting is returned to the initial value in accordance with a user operation. PTL 1 discloses a contrast adjustment apparatus for returning the setting of a contrast to the initial value in a case in which a long pressing operation of a key is detected.

CITATION LIST

Patent Literature

[PTL 1] Japanese Unexamined Patent Application Publication No. 2008-287198

SUMMARY OF INVENTION

Technical Problem

However, the contrast adjustment apparatus disclosed in PTL 1 cannot cope with a change of visibility unintended by the user. This will be described in the following.

First, there is a case in which the electronic whiteboard includes an interface for inputting an image. The electronic whiteboard displays, on the display, video input from an image input apparatus, which is connected to the electronic whiteboard, to the electronic whiteboard. However, because the video of the image input apparatus is stored in a memory of the electronic whiteboard, the memory capacity is oppressed (put under stress). In this case, the electronic whiteboard changes color space of the display in order to display, with the limited memory capacity, handwritten information and the video input by the image input apparatus. For example, by changing the color space from the YUV444 to the YUV422, data necessary for drawing one pixel can be reduced, and the handwritten information and the video input by the image input apparatus can be displayed with the limited memory capacity.

However, when the color space is changed, a change occurs in the display as if the setting of the contrast (maximum luminance/minimum luminance) is changed when viewed from the user, even if the user does not change the video setting. As a result, a problem unintended by the user may occur in which a grid line drawn with a pale color and/or a small point becomes difficult to be viewed.

In view of the above problem, an object of the present invention is to provide an information processing apparatus, and an image displaying method that can prevent decrease of visibility of a display when an image is input from an outside.

Solution to Problem

An embodiment is an information processing apparatus for displaying a first image on a display apparatus. The information processing apparatus includes a display request detection unit configured to detect a display request to the display apparatus for displaying a second image that is different from the first image; an image acquisition unit configured to acquire an image signal of the second image from an outside; a superimposition display unit configured to superimpose and display the second image, formed by using the image signal, on the first image in a case in which the display request detection unit detects the display request; and a display mode changing unit configured to change, in a case in which the second image is superimposed and displayed on the first image, at least a display mode of the first image.

Advantageous Effects of Invention

An information processing apparatus and an image displaying method that can prevent decrease of visibility of a display when an image is input from an outside may be provided.

BRIEF DESCRIPTION OF DRAWINGS

FIG. 1 is a schematic drawing illustrating an example of an overall configuration of an image processing system according to an embodiment;

FIG. 2 is a block diagram illustrating an example of a hardware configuration of an electronic whiteboard;

FIG. 3 is a block diagram illustrating an example of a functional configuration of the electronic whiteboard;

FIG. 4 is a block diagram illustrating an example of a functional configuration of a file process unit;

FIG. 5 is a block diagram illustrating a functional configuration of a client unit and server unit;

FIG. 6 is a table illustrating an example of a data configuration of page data;

FIG. 7 is a table illustrating an example of a data configuration of stroke arrangement data;

FIG. 8 is a table illustrating an example of a data configuration of coordinates arrangement data;

FIG. 9 is a table illustrating an example of a data configuration of media data;

FIG. 10 is a table illustrating an example of a remote license management table;

FIG. 11 is a table illustrating an example of an address book management table;

FIG. 12 is an example of a data configuration of backup data;

FIG. 13 is a table illustrating an example of a connection destination management table;

FIG. 14 is a table illustrating an example of a participating location management table;

FIG. 15 is a table illustrating an example of a data configuration of operation data;

FIG. 16 is a drawing that illustrates superimposition relationships between image layers;

FIG. 17 is a sequence chart illustrating an example of processes of the electronic whiteboards.

FIG. 18 is a sequence chart illustrating an example of processes of the electronic whiteboards.

FIG. 19A is a drawing illustrating an example of a sub-window displayed on a display;

FIG. 19B is a drawing illustrating an example of a monitor button arranged on a side surface of the display;

FIG. 20 is a drawing illustrating an example of images displayed by teleconference terminals;

FIG. 21 is a flowchart illustrating an example of procedures for switching a contrast value;

FIG. 22 is a block diagram illustrating a functional configuration of the electronic whiteboard according to a second example of the embodiment; and FIG. 23 is a flowchart illustrating an example of procedures for switching a density value.

DESCRIPTION OF EMBODIMENTS

In the following, embodiments of the present invention will be described with reference to the accompanying drawings.

<System Configuration>

FIG. 1 is a schematic drawing illustrating an overall configuration of an image processing system 1 according to an embodiment. It should be noted that in FIG. 1, for simplifying description, only two electronic whiteboards 2a and 2b and accompanying electronic pens 4a and 4b are shown. However, the image processing system 1 may include three or more electronic whiteboards and electronic pens.

As shown in FIG. 1, the image processing system 1 includes the plurality of electronic whiteboards 2a and 2b, the plurality of electronic pens 4a and 4b, USB memories 5a and 5b, notebook PCs (personal computers) 6a and 6b, teleconference (video conference) terminals 7a and 7b, and a PC 8. Further, the electronic whiteboards 2a and 2b and the PC 8 are connected in a communicative manner via a communication network 9. Moreover, displays (display apparatuses such as liquid crystal, organic electroluminescence, a projector, and a plasma TV) 3a and 3b are disposed on the electronic whiteboards 2a and 2b, respectively.

Further, the electronic whiteboard 2a is capable of displaying on the display 3a an image drawn by an event generated by the electronic pen 4a (e.g. pen tip or pen end of the electronic pen 4a touching the display 3a). It should be noted that in addition to the electronic pen 4a, the electronic whiteboard 2a is capable of changing an image displayed on the display 3a based on an event generated by a hand Ha of a user (e.g. gesture such as enlarging/reducing an image, and turning a page).

Also, the USB memory 5a can be connected to the electronic whiteboard 2a, and the electronic whiteboard 2a can read an electronic file such as a PDF file from the USB memory 5a and record an electronic file in the USB memory 5a. Further, the notebook PC 6a is connected to the electronic whiteboard 2a via a cable 10a1 that enables communication according to a standard such as Display Port, DVI (Digital Visual Interface), HDMI (High-Definition Multimedia Interface; registered trademark), and VGA (Video Graphics Array). Then, the electronic whiteboard 2a generates an event based on a touch to the display 3a, and transmits event information relating to the event to the notebook PC 6a in a manner similar to an event from an input device such as a keyboard and a mouse. The teleconference (video conference) terminal 7a is similarly connected to the electronic whiteboard 2a via a cable 10a2 that enables communication according to the above standards. It should be noted that the notebook PC 6a and the teleconference terminal 7a may communicate with the electronic whiteboard 2a according to wireless communication based on the various wireless communication protocols such as Bluetooth (registered trademark).

On the other hand, at a different location where the electronic whiteboard 2b is arranged, the electronic whiteboard 2b including the display 3b, the electronic pen 4b, the USB memory 5b, the notebook PC 6b, the teleconference terminal 7b, the cable 10b1, and the cable 10b2 are similarly used in the manner described above. Further, an image displayed on the display 3b may be changed based on an event generated by a hand Hb of a user, for example.

In this way, an image drawn on the display 3a of the electronic whiteboard 2a at a first location may also be displayed on the display 3b of the electronic whiteboard 2b at a second location. Also, an image drawn on the display 3b of the electronic whiteboard 2b at the second location may also be displayed at the display 3a of the electronic whiteboard 2a at the first location. As described above, in the image processing system 1, a remote sharing process for sharing the same image at remote locations may be performed. Thus, the image processing system 1 may be conveniently used to hold conferences at remote locations.

It should be noted that in the following descriptions, an arbitrary electronic whiteboard of a plurality of electronic whiteboards may be referred to as the "electronic whiteboard 2". An arbitrary display of a plurality of displays may be referred to as the "display 3". An arbitrary electronic pen of a plurality of electronic pens may be referred to as the "electronic pen 4". An arbitrary USB memory of a plurality of USB memories may be referred to as the "USB memory 5". An arbitrary notebook PC of a plurality of notebook PCs may be referred to as the "notebook PC 6". An arbitrary teleconference terminal of a plurality of teleconference terminals may be referred to as the "teleconference terminal 7". Further, an arbitrary hand of a plurality of hands of the users may be referred to as the "hand H". An arbitrary cable of a plurality of cables may be referred to as the "cable 10".

Further, in the embodiment, an electronic whiteboard is described as an example of an information processing apparatus. However, an information processing apparatus of the present invention is not limited to this. As another example of the information processing apparatus, an electronic signboard (digital signage), a telestrator (video marker) used in sports, weather broadcasts or the like, and a remote image (video) diagnostic apparatus may be used. Also, although the notebook PC 6 is described as an example of an information processing terminal, the present invention is not limited to this. As another example of the information processing terminal, a desktop PC, a tablet PC, a PDA (personal digital assistant), a digital video camera, a digital camera, a game machine, and other types of terminals that are capable of providing an image frame may be used. Moreover, the communication network 9 may include the Internet, a LAN (Local Area Network), a mobile phone communication network, and the like. Further, in the embodiment, the USB memory 5 is described as an example of a recording medium. However, the present invention is not limited to this. As another example of the recording medium, a variety of recording media such as an SD card may be used.

<Hardware Configuration of Electronic Whiteboard 2>

In the following, a hardware configuration of the electronic whiteboard 2 according to the embodiment will be described with reference to FIG. 2. FIG. 2 is a block diagram illustrating a hardware configuration of the electronic whiteboard 2.

As shown in FIG. 2, the electronic whiteboard 2 includes a CPU 101 that controls overall operations of the electronic whiteboard 2, a ROM 102 that stores programs such as an IPL (initial program loader) used for activating the CPU 101, a RAM 103 that is used as a work area of the CPU 101, a SSD (solid-state drive) 104 that stores various data and programs such as a program for the electronic whiteboard 2, a network controller 105 that controls communication with the communication network 9, and an external storage controller 106 that controls communication with the USB memory 5. Thus, the electronic whiteboard 2 serves as an information processing apparatus.

The electronic whiteboard 2 also includes a capture device 111 that displays video information as a still image or a moving image (video) on a display of the notebook PC 6, a GPU (Graphics Processing Unit) 112 dedicated to handling graphics, and a display controller 113 that controls and manages screen display operations for outputting (displaying) an output image from the GPU to the display 3 and/or the teleconference terminal 7.

The electronic whiteboard 2 further includes a sensor controller 114 that controls process operations of a contact sensor 115, and the contact sensor 115 that detects the contact of an object such as the electronic pen 4 and the hand H of the user with a display surface of the display 3. The contact sensor 115 inputs coordinates and detects the coordinates based on an infrared ray cutting off method. In the method of inputting the coordinates and detecting the coordinates, two light emitting/receiving apparatuses arranged at two upper side edges of the display 3 emit a plurality of infrared rays in a direction parallel to the display 3. Because the infrared rays reflected by reflecting members arranged around the display 3 return via the same light path as the emitted light, light receiving elements receive the reflected infrared rays. The contact sensor 115 outputs, to the sensor controller 114, an ID (identification) of the infrared rays emitted by the two light emitting/receiving apparatuses that is shielded by an object, and the sensor controller 114 determines the coordinates position that is the contact position of the object. It should be noted that each ID that is described below is an example of identification information.

Further, the contact sensor 115 is not limited to an infrared sensor described above. For example, various other types of detection units such as a capacitive touch panel that determines a contact position by detecting a change in capacitance, a resistive touch panel that detects a contact position by detecting a voltage change of two opposing resistance films, and an electromagnetic induction touch panel that determines a contact position by detecting electromagnetic induction generated by a contact object coming into contact with a display unit.

Also, the electronic whiteboard 2 includes an electronic pen controller 116. The electronic pen controller 116 communicates with the electronic pen 4 to determine whether a pen tip or a pen end of the electronic pen 4 is touching the display 3. It should be noted that in some embodiments, in addition to detecting a touch at the pen tip and the pen end of the electronic pen 4, the electronic pen controller 116 may detect whether other parts of the electronic pen 4 such as a grip part to be gripped by a user are in contact with the display 3.

Further, the electronic whiteboard 2 includes a bus line 120 such as an address bus and a data bus for electrically connecting the CPU 101, the ROM 102, the RAM 103, the SSD 104, the network controller 105, the external memory controller 106, the capture device 111, the GPU 112, the sensor controller 114, and the electronic pen controller 116 as shown in FIG. 2.

It should be noted that in some embodiments, the program for the electronic whiteboard 2 may be recorded on a computer-readable recording medium such as a CD-ROM and distributed as a program product.

<Functional Configuration of Electronic Whiteboard 2>

In the following, a functional configuration of the electronic whiteboard 2 according to the embodiment will be described with reference to FIGS. 3 to 16. First, an overall functional configuration of the electronic whiteboard 2 will be described with reference to FIG. 3. FIG. 3 is a block diagram illustrating a functional configuration of the electronic whiteboard 2.

It should be noted that the functional elements of the electronic whiteboard 2 shown in FIG. 3 may be implemented by the hardware elements shown in FIG. 2 and relevant programs. The electronic whiteboard 2 can act as a "host apparatus" that first starts a remote sharing process, and can also act as a "participating apparatus" that joins a remote sharing process that has already been started. Further, the electronic whiteboard 2 includes a client unit 20 and a server unit 90 as its main functional units. That is, the functions of the client unit 20 and the server unit 90 are implemented within the housing of the electronic whiteboard 2. In a case in which the electronic whiteboard 2 acts as a host apparatus, the functions of the client unit 20 and the server unit 90 are implemented in this electronic whiteboard 2. Further, in a case in which the electronic whiteboard 2 acts as a participating apparatus, the function of the client unit 20 is implemented in this electronic whiteboard 2, but the function of the server unit 90 is not implemented within this electronic whiteboard 2. That is, in FIG. 1, in a case in which the electronic whiteboard 2a acts as the host apparatus and the electronic whiteboard 2b acts as the participating apparatus, the client unit 20 of the electronic whiteboard 2a communicates with the client unit 20 of the other electronic whiteboard 2b via the server unit 90 implemented within the electronic whiteboard 2a. On the other hand, the client unit 20 of the electronic whiteboard 2b communicates with the client unit 20 of the other electronic whiteboard 2a via the server unit 90 implemented within the other electronic whiteboard 2a.

<Functional Configuration of Client Unit 20>

In the following, a functional configuration of the client unit 20 will be described with reference to FIGS. 3 to 5. As shown in FIG. 3, the client unit 20 includes a video acquisition unit 21, a coordinates detection unit 22, an automatic adjustment unit 23, a contact detection unit 24, an event sorting unit 25, an operation process unit 26, a gesture process unit 27, a video superimposition unit 28, an image processing unit 30, and a communication control unit 60.

The video acquisition unit 21 acquires an output video from a video output device such as the notebook PC 6 that is connected to the cable 10. In response to receiving an image signal from the video output device, the video acquisition unit 21 analyzes the received image signal, derives image information such as the resolution of an image frame corresponding to a display image of the video output device to be formed by the image signal and the update frequency of the image frame, and outputs the image information to an image acquisition unit 31.

The coordinates detection unit 22 detects the coordinates (coordinate position) of an event generated by a user on the display 3 (operation such as the hand H of the user touching the display 3). The coordinates detection unit 22 also detects an area of a touched region.

The automatic adjustment unit 23 is activated when the electronic whiteboard 2 is activated and adjusts parameters of an image process of an optical sensor camera of the contact sensor 115 such that the contact sensor 115 can output appropriate values to the coordinates detection unit 22.

The contact detection unit 24 detects an event generated by the user operating the electronic pen 4 (operation such as pressing (touching) of the pen tip or the pen end of the electronic pen 4 on the display 3).

The event sorting unit 25 sorts the coordinates of events detected by the coordinates detection unit 22 and the detection results of detections made by the contact detection unit 24 into various events including stroke drawing, a UI (user interface) operation, and a gesture operation.

Here, "stroke drawing" is an event that occurs when the user presses the electronic pen 4 on the display 3, moves the electronic pen 4 in the pressed state, and ultimately detaches the electronic pen 4 from the display 3 in a case in which a stroke image (B) shown in FIG. 16 (described later) is displayed on the display 3. For example, letters of the alphabet such as "S" and "T" may be drawn on the display 3 by stroke drawing. It should be noted that stroke drawing is not limited to drawing an image but includes other various events such as deleting a drawn image and editing a drawn image.

"UI operation" is an event that occurs when the user presses a predetermined position with the electronic pen 4 or the hand H in a case in which a UI image (A) shown in FIG. 16 (described later) is displayed on the display 3. For example, the width or color of a line drawn by the electronic pen 4 may be set by the UI operation.

"Gesture operation" is an event that occurs when the user touches the display 3 with the hand H or moves the hand H on the display 3 in a case in which the stroke image (B) shown in FIG. 16 (described later) is displayed on the display 3. An image can be enlarged (or reduced), a display region can be changed, or a page can be turned by the gesture operation in which the user moves the hand H on the display 3 while touching the display 3 with the hand H, for example.

Among UI elements that are determined as UI operations by the event sorting unit 25, the operation process unit 26 executes various operations according to the UI element associated with the generated event. The UI element may be a button, a list, a checkbox, or a textbox, for example.

The gesture process unit 27 executes an operation corresponding to the gesture operation determined by the event sorting unit 25.

The video superimposition unit 28 displays, on a video output device (such as the display 3), an image superimposed by a display superimposition unit 36 (described below) as video. Also, the video superimposition unit 28 creates a picture-in-picture superimposition image by combining video from a video output device (such as the notebook PC6) with video sent from another video output device (such as the teleconference terminal 7). Further, the video superimposition unit 28 performs switching operations for displaying a picture-in-picture video displayed within a portion of the display 3 on the entire display 3.

The image processing unit 30 performs various image processes such as a superimposition process of image layers shown in FIG. 16. The image processing unit 30 includes the image acquisition unit 31, the stroke process unit 32, a UI image generation unit 33, a background generation unit 34, a layout management unit 35, the display superimposition unit 36, a page process unit 37, a file process unit 40, a page data storage unit 300, and a remote license management table 310.

The image acquisition unit 31 acquires each frame from the video acquired by the video acquisition unit 21 as an image. The image acquisition unit 31 outputs data of the acquired image to the page process unit 37. This image corresponds to an output image (C) from a video output device (such as the notebook PC 6) shown in FIG. 16.

The stroke process unit 32 draws a stroke image by connecting contact positions of the hand H or the electronic pen 4, deletes a drawn image, or edits a drawn image based on an event that has been sorted by the event sorting unit 25 as a stroke drawing event. The image generated by the stroke drawing corresponds to the stroke image (B) shown in FIG. 16. Also, the results of drawing, deleting, and editing an image based on the stroke drawing are stored as operation data, which is described later, in an operation data storage unit 840.

The UI image generation unit 33 generates a UI (user interface) image that is set in the electronic whiteboard 2 in advance. The UI image corresponds to a UI image (A) shown in FIG. 16.

The background generation unit 34 receives, from the page process unit 37, the media data of the page data read from the page data storage unit 300 by the page process unit 37. The background generation unit 34 outputs the received media data to the display superimposition unit 36. Further, an image represented by the media data corresponds to a background image (D) shown in FIG. 16. A pattern of the background image (D) may be a solid color or a grid display.

The layout management unit 35 manages layout information for the display superimposition unit 36. The layout information represents the layout of images output from the image acquisition unit 31, the stroke process unit 32, and the UI image generation unit 33 (or the background generation unit 34). In this way, the layout management unit 35 may provide, to the display superimposition unit 36, directions about the display positions of the output image (C) and the stroke image (B) within the UI image (A) and the background image (D), and directions about whether to display/hide these images.

The display superimposition unit 36 lays out (arranges) the images output from the image acquisition unit 31, the stroke process unit 32, the UI image generation unit 33, and the background generation unit 34 based on the layout information output from the layout management unit 35.

The page process unit 37 combines data of the stroke image (B) and data of the output image (C) into one set of page data to store the page data in the page data storage unit 300. The data of the stroke image (B) may form a part of the page data as stroke arrangement data (each stroke data) represented by stroke arrangement data IDs shown in FIG. 6. The data of the output image (C) may form a part of the page data as media data represented by media data IDs of the page data shown in FIG. 6. Then, when media data of page data is read from the page data storage unit 300, the media data is handled as data of the background image (D).

Also, the page process unit 37 transmits, to the display superimposition unit 36 via the background generation unit 34, media data of the page data that is once stored so that the video superimposition unit 28 can redisplay the background image (D) on the display 3. Also, the page process unit 37 returns the stroke arrangement data (each stroke data) of the page data to the stroke process unit 32 in order to enable re-editing of the stroke. Further, the page process unit 37 can delete or replicate the page data.

That is, the data of the output image (C), being displayed on the display 3 at the time when the page process unit 37 stores the page data in the page data storage unit 300, is once stored in the page data storage unit 300. When the stored data is read from the page data storage unit 300 thereafter, the stored data is read as media data representing the background image (D). Then, the page process unit 37 outputs, to the stroke process unit 32, the stroke arrangement data representing the stroke image (B) of the page data read from the page data storage unit 300. Also, the page process unit 37 outputs, to the background generation unit 34, the media data representing the background image (D) of the page data read from the page data storage unit 300.

The display superimposition unit 36 superimposes the output image (C) from the image acquisition unit 31, the stroke image (B) from the stroke process unit 32, the UI image (A) from the UI image generation unit 33, and the background image (D) from the background generation unit 34 according to the layout designated by the layout management unit 35. In this way, as shown in FIG. 16, the UI image (A), the stroke image (B), the output image (C), and the background image (D) may be layered in the appropriate order such that the user can view the image contents even when the images are overlaid.

Also, the display superimposition unit 36 may superimposes either the output image (C) or the background image (D) shown in FIG. 16 on the UI image (A) and the stroke image (B) by switching between the output image (C) and the background image (D). For example, in a case in which the cable 10 between the electronic whiteboard 2 and the video output device (such as the notebook PC 6) is unplugged in a state in which the image (A), the image (B), and the image (C) are initially displayed, and, based on the designation of the layout management unit 35, the display superimposition unit 36 can exclude the image (C) from the superimposition targets and display the image (D). In this case, the display superimposition unit 36 may also perform operations such as expansion of the display, reduction of the display, and moving the display region.

The remote license management table 310 manages license data that is required for executing a remote sharing process. As shown in FIG. 10, the remote license management table 310 stores a product ID of the electronic whiteboard 2, a license ID used for authentication, and a license expiration date in association with each other.

«Page Data»

The page data storage unit 300 stores page data as shown in FIG. 6. FIG. 6 is a table illustrating a data configuration of page data. Page data is data of one page (stroke arrangement data (each stroke data) and media data) to be displayed on the display 3. It should be noted that because a wide variety of parameters are included in the page data, the contents of the page data will be described separately with reference to FIGS. 6 to 9.

As shown in FIG. 6, page data includes various items of information stored in association with each other such as a page data ID for identifying a page, a start time indicating the time when displaying the page has started, an end time indicating the time when rewriting the page according to stroke drawing and/or gesture operations has ended, a stroke arrangement data ID for identifying stroke arrangement data generated by a stroke of the electronic pen 4 or the hand H, and a media data ID for identifying media data. It should be noted that the page data is managed in file units. The stroke arrangement data is data for displaying the stroke image (B) shown in FIG. 16 on the display 3 as described in detail below. Media data is data for displaying the background image (D) shown in FIG. 16 on the display 3 (D) as described in detail below.

For example, in a case in which a letter of the alphabet "S" is drawn by the user using the electronic pen 4, because the letter "S" can be written with one stroke, the single letter "S" is represented by one stroke ID. On the other hand, in a case in which a letter of the alphabet "T" is drawn by the user using the electronic pen 4, because the letter "T" is written with two strokes, the single letter "T" is represented by two stroke IDs.

Further, the stroke arrangement data includes detailed information as shown in FIG. 7. FIG. 7 is a table illustrating a data configuration of the stroke arrangement data. As shown in FIG. 7, one set of stroke arrangement data may include a plurality of sets of stroke data. One set of stroke data includes a stroke ID for identifying the stroke data, a start time indicating the time when writing the stroke has started, an end time indicating the time when writing the stroke has ended, a stroke color, a stroke width, and a coordinates arrangement data ID for identifying arrangement of pass points of the stroke.

Further, the coordinates arrangement data may include detailed information as shown in FIG. 8, for example. FIG. 8 is a table illustrating a data configuration of the coordinates arrangement data. As shown in FIG. 8, the coordinates arrangement data includes information on a point (X coordinate and Y coordinate) on the display 3, a difference time (ms) between the start time of the stroke and the time when the stroke passes this point, and a writing pressure of the electronic pen 4 at this point. That is, one item of the coordinates arrangement data shown in FIG. 7 represents a collection of points shown in FIG. 8. For example, in the case in which the user draws the alphabet "S" using the electronic pen 4, the alphabet "S" may be drawn in one stroke, but the stroke passes through a plurality of points from the start to end of drawing the stroke. Thus, the coordinates arrangement data of the stroke includes information of these points.

Further, the media data of the page data shown in FIG. 6 includes detailed information as shown in FIG. 9. FIG. 9 is a table illustrating a data configuration of the media data. As shown in FIG. 9, the media data includes various items of information stored in association with each other such as the media data ID corresponding to the media data ID in the page data shown in FIG. 6, a data type of the media data, a recording time when the page data was stored in the page data storage unit 300 by the page process unit 37, an image position (X coordinate and Y coordinate) and an image size (width and height) of the image to be displayed on the display 3 by the page data, and data indicating the content of the media data. The position of the image to be displayed on the display 3 by the page data represents the upper left edge position of the image to be displayed by the page data assuming the coordinates (X coordinate, Y coordinate) of the upper left edge of the display 3 is (X, Y)=(0, 0).

(Functional Configuration of File Process Unit 40)

In the following, a functional configuration of the file process unit 40 shown in FIG. 3 will be described with reference to FIG. 4. FIG. 4 is a block diagram illustrating a functional configuration of the file process unit 40. The file process unit 40 includes a recovery process unit 41, a file input unit 42a, a file output unit 42b, a file conversion unit 43, a file transmitting unit 44, an address book input unit 45, a backup process unit 46, a backup output unit 47, a setting management unit 48, a setting file input unit 49a, and a setting file output unit 49b. The file process unit 40 further includes an address book management table 410, a backup data storage unit 420, a setting file storage unit 430, and a connection destination management table 440.

After the electronic whiteboard 2 terminates abnormally, the recovery process unit 41 detects the abnormal termination, and recovers page data that has not been stored. For example, in a case in which the electronic whiteboard 2 terminates normally, page data is stored as a PDF file in the USB memory 5 via the file process unit 40. However, in a case in which the electronic whiteboard 2 terminates abnormally due to power failure or the like, the page data is stored in the page data storage unit 300 but not in the USB memory 5. Thus, when the power is turned on again, the recovery process unit 41 recovers the page data by retrieving the page data from the page data storage unit 300.

The file input unit 42a reads a PDF file from the USB memory 5 and stores page data of each page of the PDF file in the page data storage unit 300.

The file conversion unit 43 converts the page data stored in the page data storage unit 300 into a PDF file.

The file output unit 42b records (stores) the PDF file that is output by the file conversion unit 43 in the USB memory 5.

The file transmitting unit 44 attaches the PDF file generated by the file conversion unit 43 to an email and transmits the email. The destination of the file is determined by having the display superimposition unit 36 display contents of the address book management table 410 on the display 3, and having the file transmitting unit 44 accept a selection of the destination based on a user operation of an input unit such as a touch panel. As shown in FIG. 11, the address book management table 410 manages (stores) a name and an email address of a destination in association with each other. Further, the file transmitting unit 44 can receive an input of the destination email address based on a user operation of an input unit such as a touch panel.

The address book input unit 45 reads a list file of email addresses from the USB memory 5 and manages the read list file in the address book management table 410.

The backup process unit 46 performs a backup process by storing, in the backup data storage unit 420 as backup data, a file output by the file output unit 42b or a file transmitted by the file transmitting unit 44. It should be noted that the backup process is not performed in a case in which the user does not perform the backup setting. The backup data is stored in PDF format as shown in FIG. 12.

The backup output unit 47 stores the backup file in the USB memory 5. When storing the backup file, a password is input for security purposes based on the operation of the input unit such as the touch panel.

The setting management unit 48 manages various kinds of setting information of the electronic whiteboard 2 by storing/reading the setting information in/from the setting file storage unit 430. For example, the various kinds of setting information may include, network settings, time/date settings, region/language settings, mail server settings, address book settings, connection destination list settings, and/or settings relating to the backup. It should be noted that network settings may include, for example, an IP address setting of the electronic whiteboard 2, a netmask setting, a default gateway setting, and/or a DNS (Domain Name System) setting.

The setting file output unit 49b records (stores) the various kinds of setting information of the electronic whiteboard 2 in the USB memory 5 as a setting file. It should be noted that the user cannot view the content of the setting file for security reasons.

The setting file input unit 49a reads the setting file stored in the USB memory 5 and applies the various kinds of setting information to the various settings of the electronic whiteboard 2.

The address book input unit 50 reads a list file of IP addresses of connection destinations of the remote sharing process from the USB memory 5 and manages the read list file in the connection destination management table 440. As shown in FIG. 13, the connection destination management table 440 is a table for managing IP addresses of connection destinations in advance. The connection destination management table 440 is used when the electronic whiteboard 2 acts as a participating apparatus that is attempting to participate in (join) a remote sharing process. By using the connection destination management table 440, the user of the participating apparatus may be relieved of the trouble of having to manually input (enter) the IP address of the electronic whiteboard 2 acting as the host apparatus of the remote sharing process. The destination management table 440 manages a name of a location where the electronic whiteboard 2, which may act as a host apparatus of a remote sharing process which the participating apparatus may be able to participate in, is arranged, and the IP address of this electronic whiteboard 2.

It should be noted that the connection destination management table 440 may be omitted. However, in this case, the user of the participating apparatus has to manually input the IP address of the host apparatus by operating an input device such as a touch panel in order to start the remote sharing process with the host apparatus. Thus, the user of the participating apparatus may acquire the IP address of the host apparatus from the user of the host apparatus via telephone, email or the like.

(Functional Configuration of Communication Control Unit 60)

In the following, a functional configuration of the communication control unit 60 will be described with reference to FIG. 5. FIG. 5 is a block diagram illustrating a functional configuration of the client unit 20 and server unit 90. The communication control unit 60 controls communications with another electronic whiteboard 2 via the communication network 9 and communications with the communication control unit 70 in the server unit 90 (described below). Thus, the communication control unit 60 includes a remote start process unit 61, a remote participation process unit 62, a remote image transmitting unit 63, a remote image receiving unit 64, a remote operation transmitting unit 65, a remote operation receiving unit 66, and a participating location management table 610.

The remote start process unit 61 requests the server unit 90 within the same electronic whiteboard 2 to start a new remote sharing process, and receives a result of the request from the server unit 90. In this case, the remote start process unit 61 refers to the remote license management table 310. In a case in which license information (e.g. product ID, license ID, and expiration date) is managed in the remote license management table 310, the remote start process unit 61 can make a request to start the remote sharing process. However, in a case in which the license information is not managed in the remote license management table 310, a request to start the remote sharing process cannot be made.

In a case in which the electronic whiteboard 2 acts as a host apparatus of a remote sharing process, the participating location management table 610 manages one or more other electronic whiteboards 2 currently participating in the remote sharing process as participating apparatuses. As shown in FIG. 14, the participating location management table 610 manages a name of the location in which the electronic whiteboard 2 participating in the remote sharing process is installed and an IP address of this electronic whiteboard 2 in association with each other.

The remote participation process unit 62 transmits a participation request for participating in a remote sharing process to a remote connection request receiving unit 71 in the server unit 90 of the electronic whiteboard 2 acting as the host apparatus that has started the remote sharing process via the communication network 9. In this case, the remote participation process unit 62 refers to the remote license management table 310. Also, in a case of participating in the remote sharing process that has already been started, the remote participation process unit 62 refers to the connection destination management table 440 to acquire the IP address of the electronic whiteboard 2 of the participation destination. It should be noted that in some embodiments, the connection destination management table 440 may not be referenced by the remote participation process unit 62, and the IP address of the electronic whiteboard 2 corresponding to the participation destination may be input by the user operating an input unit such as a touch panel.

The remote image transmitting unit 63 transmits, to the server unit 90, the output image (C) transmitted from the video acquisition unit 21 via the image acquisition unit 31.

The remote image receiving unit 64 receives image data from a video output device connected to another electronic whiteboard 2 from the server unit 90 and outputs the received image data to the display superimposition unit 36 to enable the remote sharing process.

The remote operation transmitting unit 65 transmits, to the server unit 90, various kinds of operation data required for the remote sharing process. The operation data may include, for example, data relating to operations such as adding a stroke, deleting a stroke, editing a stroke (e.g. enlarging, minifying, moving), storing page data, creating page data, duplicating page data, deleting page data, and switching a page being displayed. Further, the remote control receiving unit 66 receives, from the server unit 90, operation data input in another electronic whiteboard 2, and outputs the received operation data to the image processing unit 30 to perform the remote sharing process.

<Functional Configuration of Server Unit 90>

In the following, a functional configuration of the server unit 90 will be described with reference to FIG. 5. The server unit 90 is included in each electronic whiteboard 2 such that each electronic whiteboard 2 may be capable of acting as the server unit (host apparatus) 90. Thus, the server unit 90 includes the communication control unit 70 and a data management unit 80.

(Functional Configuration of Communication Control Unit 70)

In the following, a functional configuration of the communication control unit 70 will be described with reference to FIG. 5.

The communication control unit 70 controls communications with the communication control unit 60 of the client unit 20 within the same electronic whiteboard 2 and communications with the communication control unit 70 of another electronic whiteboard 2 via the communication network 9. The data management unit 80 manages various kinds of data such as operation data and image data.

More specifically, the communication control unit 70 includes the remote connection request receiving unit 71, a remote connection result transmitting unit 72, a remote image receiving unit 73, a remote image transmitting unit 74, a remote operation receiving unit 75, and a remote operation transmitting unit 76.

The remote connection request receiving unit 71 receives a start request for starting the remote sharing process from the remote start process unit 61, and receives a participation request for participating in the remote sharing process from the remote participation process unit 62 of the other electronic whiteboard 2 via the communication network 9. The remote connection result transmitting unit 72 transmits the result of the start request for starting the remote sharing process to the remote start process unit 61, and transmits the result of the participation request for participating in the remote sharing process to the remote participation process unit 62 of the other electronic whiteboard 2 via the communication network 9.

The remote image receiving unit 73 receives image data (e.g. data of the output image (C)) from the remote image transmitting unit 63 and transmits the received image data to a remote image processing unit 82, which is described later. The remote image transmitting unit 74 receives image data from the remote image processing unit 82 and transmits the received image data to the remote image receiving unit 64.

The remote operation receiving unit 75 receives operation data from the remote operation transmitting unit 65 (e.g. data of the stroke image (B)) and transmits the received operation data to a remote operation process unit 83, which is described later. The remote operation transmitting unit 76 receives operation data from the remote operation process unit 83 and transmits the received operation data to the remote operation receiving unit 66.

(Functional Configuration of Data Management Unit 80)

In the following, a functional configuration of the data management unit 80 will be described with reference to FIG. 5.

The data management unit 80 includes a remote connection process unit 81, a remote image processing unit 82, a remote operation process unit 83, an operation synthesis process unit 84, and a page process unit 85. The server unit 90 further includes a passcode management unit 810, a participating location management table 820, an image data management unit 830, an operation data storage unit 840, and a page data storage unit 850.

The remote connection process unit 81 starts a remote sharing process and terminates the remote sharing process. The remote connection process unit 81 also confirms whether a license is present and whether the license is within a valid period based on license information received by the remote connection request receiving unit 71 from the remote start process unit 61 together with a start request for starting a remote sharing process, or license information received by the remote connection request receiving unit 71 from the remote participation process unit 62 together with a participation request for participating in a remote sharing process. Further, the remote connection process unit 81 confirms whether the number of participation requests received from other electronic whiteboards 2 as client units 20 has not exceeded a predetermined number of participating apparatuses that are allowed to participate in the remote sharing process.

Further, the remote connection process unit 81 determines whether a passcode received along with the participation request for participating in the remote sharing process from another electronic whiteboard 2 is the same as a passcode managed in the passcode management unit 810. In a case in which the passcodes are determined to be the same, the remote connection process unit 81 allows the requesting electronic whiteboard 2 to participate in the remote sharing process. It should be noted that the passcode is issued by the remote connection process unit 81 when starting a new remote sharing process, and the passcode may be communicated from, the user of the electronic whiteboard 2 acting as the host apparatus to, a user of another electronic whiteboard 2 that intends to participate in the remote sharing process as a participating apparatus via telephone or email, for example. Then, the user of the other electronic whiteboard 2 that intends to participate in the remote sharing process as the participating apparatus may input the passcode to this other electronic whiteboard 2, via an input unit such as a touch panel, and transmit a participation request. In this way, the other electronic whiteboard 2 can be allowed to participate in the remote sharing process. It should be noted that in some embodiments, the confirmation of the passcode may be omitted while giving higher priority to user convenience than security, and participation in a remote sharing process may be allowed merely through confirmation of the license.

Also, in a case in which the electronic whiteboard 2 acts as the host apparatus, the remote connection process unit 81 stores, in the participating location management table 820 of the server unit 90, participating location information included in the participation request transmitted via the communication network 9 from the remote participation process unit 62 of the other electronic whiteboard 2 that acts as the participating apparatus. The remote connection processing unit 81 then reads the remote location information stored in the participating location management table 820 and transmits the remote location information to the remote connection result transmitting unit 72. The remote connection result transmitting unit 72 transmits the remote location information to the remote start process unit 61 in the client unit 20 of the same host apparatus. The remote start process unit 61 stores the remote location information in the participating location management table 610. In this way, in the host apparatus, the remote location information may be managed at both the client unit 20 and the server unit 90.

The remote image processing unit 82 receives image data (output image (C)) from the video output device (such as the notebook PC 6) connected to the client unit 20 of each electronic whiteboard 2 participating in the remote sharing process (including the client unit 20 of the own electronic whiteboard 2 that is the host apparatus) and stores the received image data in the image data storage unit 830. Also, the remote image processing unit 82 determines the order of displaying the image data to be shared in the remote sharing process based on the order in which the image data are received at the server unit 90 of the own electronic whiteboard 2 that is the host apparatus. Also, the remote image processing unit 82 refers to the participating location management table 820, and transmits the image data according to the display order as determined above to the client unit 20 of each of the electronic whiteboards 2 participating in the remote sharing process (including the client unit 20 of the own electronic whiteboard 2 that is the host apparatus) via the communication control unit 70 (remote image transmitting unit 74).

The remote operation process unit 83 receives various kinds of operation data (such as the stroke image (B)) relating to a stroke image drawn at the client unit 20 of each electronic whiteboard 2 participating in the remote sharing process (including the client unit 20 of the own electronic whiteboard 2 that is the host apparatus), and determines the order of displaying the images to be shared in the remote sharing process based on the order in which the operation data is received at the server unit 90 of the own electronic whiteboard 2 that is the host apparatus. It should be noted that the various kinds of operation data may be the same as the various kinds of operation data described above. Also, the remote operation process unit 83 refers to the participating location management table 820 and transmits the operation data to the client unit 20 of each of the electronic whiteboards 2 participating in the remote sharing process (including the client unit 20 of the own electronic whiteboard 2 that is the host apparatus).

The operation synthesis process unit 84 synthesizes the operation data of each electronic whiteboard 2 output from the remote operation process unit 83, stores the operation data resulting from the synthesis process in the operation data storage unit 840, and returns the operation data to the remote operation process unit 83. The operation data is then transmitted, from the remote operation transmitting unit 76, to the client unit 20 of the electronic whiteboard 2 that is the host apparatus and the client unit 20 of each of the electronic whiteboards 2 that are participating apparatuses. In this way, the image relating to the same operation data may be displayed at each of the electronic whiteboards 2. FIG. 15 is a table illustrating an example of a configuration of the operation data. As shown in FIG. 15, the operation data has various items of data associated with each other including a sequence number (SEQ), the operation name of the operation data, the IP address of the electronic whiteboard 2 corresponding to the transmission source of the operation data and the port number of the client unit 20 (server unit 90), the IP address of the electronic whiteboard 2 corresponding to the destination of the operation data and the port number of the client unit 20 (server unit 90), the operation type of the operation data, the operation object of the operation data, and the data content of the operation data. For example, the operation data with the sequence number (SEQ) 1 indicates that a stroke has been drawn at the client unit 20 (Port No.: 50001) of the electronic whiteboard 2 that is the host apparatus (IP address: 192.0.0.1), and the operation data (relating to the stroke drawing) has been transmitted to the server unit 90 (Port No.: 50000) of the electronic whiteboard 2 that is the same host apparatus (IP address: 192.0.0.1). In this operation data, the operation type is "STROKE", the operation object is the page data ID "p005", and the data representing the content of the operation data is data representing the stroke. Further, the operation data with the sequence number (SEQ) 2 indicates that the operation data has been transmitted from the server unit 90 (Port No.: 50000) of the electronic whiteboard 2 that is the host apparatus (IP address: 192.0.0.1) to the client unit 20 (Port No.: 50001) of another electronic whiteboard 2 that is the participating apparatus (IP address: 192.0.0.2).

It should be noted that the operation synthesis process unit 84 synthesizes the operation data according to the order in which the operation data is input to the operation synthesis process unit 84. Accordingly, if the communication network 9 is not congested, a stroke image (B) may be displayed at the display 3 of each of the electronic whiteboards 2 participating in the remote sharing process according to the order in which the strokes are drawn by the users of the electronic whiteboards 2.

The page process unit 85 has the same function as that of the page process unit 37 of the image processing unit 30 in the client unit 20. Thus, in the server unit 90, the page process unit 85 stores the page data shown in FIGS. 6-8 in the page data storage unit 850. It should be noted that because the page data storage unit 850 may have substantially the same configuration as that of the page data storage unit 300 in the image processing unit 30, descriptions of the page data storage unit 850 are omitted.

<Process and Operation of the Embodiment>

In the following, processes and operations of the embodiment will be described with reference to FIGS. 17 and 18. FIGS. 17 and 18 are sequence charts illustrating processes of electronic whiteboards 2a-2c.

In the embodiment shown in FIGS. 17 and 18, a case will be described in which the electronic whiteboard 2a serves as the host apparatus (server unit and client unit) hosting the remote sharing process, and the electronic whiteboard 2b and 2c serve as the participating apparatuses (client units) participating in the remote sharing process. Also, it should be noted that displays 3a, 3b, and 3c are connected to the electronic whiteboards 2a, 2b and 2c, respectively. Further, the notebook PCs 6a, 6b, and 6c are connected to the electronic whiteboards 2a, 2b and 2c, respectively. Also, the electronic pens 4a, 4b, and 4c are used at the electronic whiteboards 2a, 2b, and 2c, respectively.

(Participation Process)

First, a process for enabling the electronic whiteboards 2b and 2c to participate in the remote sharing process will be described with reference to FIG. 17.

When the user turns on the power of the electronic whiteboard 2a, the client unit 20 of the electronic whiteboard 2a is activated. Then, when the user performs an operation for activating the server unit 90 of the electronic whiteboard 2a by operating an input unit such as a touch panel, the remote start process unit 61 of the client unit 20 of the electronic whiteboard 2a outputs an instruction to start a process of the server unit 90 to the remote connection request receiving unit 71 in the server unit 90 of the same electronic whiteboard 2a. In this way, in the electronic whiteboard 2a, various processes may be started at both the client unit 20 and the server unit 90 (step S21).

Next, the UI image generation unit 33 in the client unit 20 of the electronic whiteboard 2a generates connection information for establishing connection with the electronic whiteboard 2a, and the video superimposition unit 28 displays, on the display 3a, the connection information acquired from the UI image generation unit 33 via the display superimposition unit 36 (step S22).

The connection information includes the IP address of the host apparatus and a passcode generated for the present remote sharing process. In this case, the passcode stored in the passcode management unit 810 is retrieved (read) by the remote connection process unit 81 shown in FIG. 5 and is sequentially transmitted to the remote connection result transmitting unit 72 and the remote start process unit 61. Further, the passcode is transmitted from the communication control unit 60 including the remote start process unit 61 to the image processing unit 30 shown in FIG. 3 and is ultimately input to the UI image generation unit 33. In this way, the passcode is included in the connection information. Then, the user of the electronic whiteboard 2a communicates the connection information to the users of the electronic whiteboards 2b and 2c via telephone or email. It should be noted that if the participating apparatus (electronic whiteboards 2b and 2c) is provided with the connection destination management table 440, the participating apparatus can be able to make a participation request to participate in the remote sharing process even the IP address of the host apparatus is not included in the connection information.

Then, at each of the electronic whiteboards 2b and 2c, when the user inputs connection information by operating an input unit such as a touch panel, the remote participation processing unit 62 of the client unit 20 of each of the electronic whiteboards 2b and 2c receives the connection information and makes a participation request by transmitting a passcode to the remote connection request receiving unit 71 of the server unit 90 of the electronic whiteboard 2a via the communication network 9 based on the IP address included in the connection information (steps S23, S24). In this way, the remote connection request receiving unit 71 of the communication control unit 70 receives the participation requests (including the passcodes) from the respective electronic whiteboards 2b and 2c and outputs the received passcodes to the remote connection process unit 81.

Then, the remote connection process unit 81 authenticates the passcode received from the client unit 20 of each of the electronic whiteboards 2b and 2c using the passcode stored in the passcode management unit 810 (step S25). Then, the remote connection result transmitting unit 72 notifies the client unit 20 of each of the electronic whiteboards 2b and 2c of the authentication result (steps S26, S27). In a case in which the respective electronic whiteboards 2b and 2c are successfully authenticated in the authentication process of step S25, communication for the remote sharing process may be established between the electronic whiteboard 2a that is the host apparatus and the electronic whiteboards 2b and 2c that are the participating apparatuses, and the remote participation process unit 62 of the client unit 20 of each of the electronic whiteboards 2b and 2c enables the start of the remote sharing process with the other electronic whiteboards (steps S28 and S29).

(Output Image Display)

In the following, a process for displaying the output image (C) in the remote sharing process will be described with reference to FIG. 17.

First, the electronic whiteboard 2b displays the output image (C) on the display 3b (step S30). Specifically, the image acquisition unit 31 of the electronic whiteboard 2b receives data of the output image (C) displayed at the notebook PC 6b from the notebook PC 6b via the video acquisition unit 21, and transmits the received image data to the display 3b via the display superimposition unit 36 and the video superimposition unit 28. In this way, the output image (C) can be displayed on the display 3b.

Next, the image processing unit 30 including the image acquisition unit 31 of the electronic whiteboard 2b transmits the data of the output image (C) to the remote image transmitting unit 63, and the communication control unit 60 including the remote image transmitting unit 63 transmits the data of the output image (C) to the communication control unit 70 of the electronic whiteboard 2a that is the host apparatus via the communication network 9 (step S31). In this way, the remote image receiving unit 73 of the electronic whiteboard 2a receives the data of the output image (C) and outputs the received image data to the remote image processing unit 82, and the remote image processing unit 82 stores the data of the output image (C) in the image data storage unit 830.

Then, the electronic whiteboard 2a that is the host apparatus displays the output image (C) on the display 3a (step S32). Specifically, the remote image processing unit 82 of the electronic whiteboard 2*a* outputs the data of the output image (C) received from the remote image receiving unit 73 to the remote image transmitting unit 74. The remote image transmitting unit 74 outputs the data of the output image (C) to the remote image receiving unit 64 of the client unit 20 of the same electronic whiteboard 2*a* that is the host apparatus. The remote image receiving unit 64 outputs the data of the output image (C) to the display superimposition unit 36. The display superimposition unit 36 outputs the data of the output image (C) to the image superimposition unit 28. The image superimposition unit 28 outputs the data of the output image (C) to the display 3*a*. In this way, the display 3*a* displays the output image (C).

Next, the communication control unit 70 including the remote image transmitting unit 74 of the server unit 90 of the electronic whiteboard 2*a* that is the host apparatus transmits via the communication network 9 the data of the output image (C) to the communication control unit 60 of the other electronic whiteboard 2*c* other than the electronic whiteboard 2*b* that is the transmission source of the data of the output image (C) (step S33). In this way, the remote image receiving unit 64 of the electronic whiteboard 2*c* that is the participating apparatus receives the data of the output image (C).

Next, the electronic whiteboard 2*c* displays the output image (C) on the display 3*c* (step S34). Specifically, the remote image receiving unit 64 of the electronic whiteboard 2*c* outputs the data of the output image (C) received in step S33 to the display superimposition unit 36 of the electronic whiteboard 2*c*. The display superimposition unit 36 outputs the data of the output image (C) to the image superimposition unit 28. The image superimposition unit 28 outputs the data of the output image (C) to the display 3*c*. In this way, the display 3*c* displays the output image (C).

It should be noted that in a case in which data of the UI image (A) and the stroke image (B) are input to the image superimposition unit 28 in addition to the data of the output image (C), the display superimposition unit 36 generates a superimposition image (A, B, C), and the video superimposition unit 28 outputs the superimposition image (A, B, C) to the display 3*c*. Further, in a case in which data of a teleconference video (E) is transmitted to the video superimposition unit 28 from the teleconference terminal 7, the video superimposition unit 28 generates a picture-in-picture superimposition image by superimposing the data of the teleconference video (E) on the superimposition image (A, B, C) and outputs the generated picture-in-picture superimposition image to the display 3*c*.

(Superimposition Image Display)

In the following, a process of displaying the superimposition image in the remote sharing process will be described with reference to FIG. 18.

First, the user draws a stroke image (B) on the electronic whiteboard 2*b* using the electronic pen 4*b* (step S41).

Then, as shown in FIG. 16, the display superimposition unit 36 of the electronic whiteboard 2*b* superimposes the stroke image (B) on the UI image (A) and the output image (C), and the video superimposition unit 28 displays the superimposition image (A, B, C) on the display 3*b* of the electronic whiteboard 2*b* (step S42). Specifically, the stroke process unit 32 of the electronic whiteboard 2*b* receives the data of the stroke image (B) as the operation data from the coordinates detection unit 22 and the contact detection unit 24 via the event sorting unit 25, and transmits the received data to the display superimposition unit 36. In this way, the display superimposition unit 36 can superimpose the stroke image (B) on the UI image (A) and the output image (C), and the video superimposition unit 28 can display the superimposition image (A, B, C) on the display 3*b* of the electronic whiteboard 2*b*.

Then, the image processing unit 30 including the stroke process unit 32 of the electronic whiteboard 2*b* transmits the data of the stroke image (B) to the remote operation transmitting unit 65, and in turn, the remote operation transmitting unit 65 of the electronic whiteboard 2*b* transmits the data of the stroke image (B) to the communication control unit 70 of the electronic whiteboard 2*a* that is the host apparatus via the communication network 9 (step S43). In turn, the remote operation receiving unit 75 of the electronic whiteboard 2*a* receives the data of the stroke image (B) and outputs the received image data to the remote operation process unit 83, and the remote operation process unit 83 outputs the data of the stroke image (B) to the operation synthesis process unit 84. In this way, each time a stroke is drawn on the electronic whiteboard 2*b*, the data of the stroke image (B) drawn on the electronic whiteboard 2*b* is sequentially transmitted to the remote operation process unit 83 of the electronic whiteboard 2*a* that is the host apparatus. The data of the stroke image (B) is data represented by each stroke data ID shown in FIG. 7. Thus, for example, as described above, because two strokes are drawn on the electronic whiteboard 2*b* when the user draws the letter (alphabet) "T" using the electronic pen 4*b*, two pieces of data of stroke images (B) that are represented by two respective stroke data IDs are sequentially transmitted.

Then, the electronic whiteboard 2*a* that is the host apparatus displays, on the display 3*a* the superimposition image (A, B, C) including the data of the stroke image (B) transmitted from the electronic whiteboard 2*b* (step S44). Specifically, the operation synthesis process unit 84 of the electronic whiteboard 2*a* synthesizes the plurality of pieces of data of the stroke images (B) sequentially transmitted via the remote operation process unit 83, stores the synthesized data of the stroke images (B) in the operation data storage unit 840, and returns the synthesized data of the stroke images (B) to the remote operation process unit 83. In this way, the remote operation process unit 83 outputs the synthesized data of the stroke images (B) received from the operation synthesis process unit 84 to the remote operation transmitting unit 76. The remote operation transmitting unit 76 outputs the synthesized data of the stroke images (B) to the remote operation receiving unit 66 of the client unit 20 of the electronic whiteboard 2*a* that is the same host apparatus. The remote operation receiving unit 66 outputs the synthesized data of the stroke images (B) to the display superimposition unit 36 of the image processing unit 30. Then, the display superimposition unit 36 superimposes the synthesized data of the stroke images (B) on the UI image (A) and the output image (C). Finally, the video superimposition unit 28 displays the superimposition image (A, B, C) generated by the display superimposition unit 36 on the display 3*a*.

Then, the communication control unit 70 including the remote operation transmitting unit 76 of the server unit 90 of the electronic whiteboard 2*a* that is the host apparatus transmits via the communication network 9 the synthesized data of the stroke images (B) to the communication control unit 60 of the other electronic whiteboard 2*c* other than the electronic whiteboard 2*b* that is the transmission source of the data of the stroke images (B) (step S45). In this way, the remote operation receiving unit 66 of the electronic whiteboard 2*c* that is the participating apparatus receives the synthesized data of the stroke images (B).

Then, the electronic whiteboard 2c displays the superimposition image (A, B, C) on the display 3c (step S46). Specifically, the remote operation receiving unit 66 of the electronic whiteboard 2c outputs the synthesized data of the stroke images (B) received in step S45 to the image processing unit 30 of the electronic whiteboard 2c. The display superimposition unit 36 of the image processing unit 30 superimposes the synthesized data of the stroke images (B) on the data of the UI image (A) and the output image (C), and outputs the data of the superimposition image (A, B, C) to the video superimposition unit 28. The video superimposition unit 28 outputs the data of the superimposition image (A, B, C) to the display 3c. In this way, the display 3c displays the superimposition image (A, B, C).

It should be noted that in the above process, the output image (C) is displayed on the display 3. However, the background image (D) may be displayed instead of the output image (C). Further, instead of displaying either the output image (C) or the background image (D), both the output image (C) and the background image (D) may be displayed on the display 3 at the same time, for example.

(Participation Termination)

In the following, with reference to FIG. 18, a process for enabling a participating apparatus to terminate participation in the remote sharing process will be described. In the embodiment shown in FIG. 18 a process is shown in which the electronic whiteboard 2c terminates the participation.

First, when the electronic whiteboard 2c receives a participation termination request for terminating participation in the remote sharing process through a user operation of the input device such as the touch panel, the remote participation process unit 62 of the electronic whiteboard 2c transmits the participation termination request to the remote connection request receiving unit 71 of the server unit 90 of the electronic whiteboard 2a that is the host apparatus (step S47). In this way, the remote connection request receiving unit 71 of the communication control unit 70 of the electronic whiteboard 2a receives the participation termination request from the electronic whiteboard 2c, and outputs the participation termination request to the remote connection process unit 81 along with the IP address of the electronic whiteboard 2c. Then, based on the IP address of the electronic whiteboard 2c transmitted from the remote connection request receiving unit 71, the remote connection process unit 81 of the electronic whiteboard 2a deletes, from the participating location management table 820, the IP address of the electronic whiteboard 2c making the participation termination request and the name of the location in which the electronic whiteboard 2c is installed. Then, the remote connection process unit 81 outputs the IP address of the electronic whiteboard 2c and the notification of the deletion to the remote connection result transmitting unit 72.

Then, the communication control unit 70 including the remote connection result transmitting unit 72 transmits, to the communication control unit 60 of the client unit 20 of the electronic whiteboard 2c via the communication network 9, a participation termination instruction to terminate participation (step S48). In turn, the remote participation process unit 62 of the communication control unit 60 of the electronic whiteboard 2c disconnects the communication of the remote sharing process to perform a termination process for terminating the participation, and in this way, participation in the remote sharing process can be terminated (step S49).

First Example

<Sub-Window Display>

In the following, a sub-window (an example of a second image) 401 will be described with reference to FIGS. 19A and 19B. FIGS. 19A and 19B are drawings illustrating an example of the sub-window 401 displayed on the display 3. FIG. 19A shows the teleconference terminal 7 connected to the display 3. FIG. 19B shows a monitor button 402 arranged on a side surface 403 of the display 3. The monitor button 402 is an operation receiving unit. Using the monitor button 402, the user notifies the electronic whiteboard 2 of a display request for displaying the sub-window 401. It should be noted that the operation receiving unit such as the monitor button 402 that detects, based on the user operation, the display request for displaying the sub-window 401 may be arranged on the electronic whiteboard 2.

In response to an event in which the monitor button 402 shown in FIG. 19B is pushed, the video superimposition unit 28 acquires the image signal of the image to be displayed by the teleconference terminal 7, and the image is displayed at the sub-window 401 of the display 3. In other words, the sub-window 401, formed by using the image signal, is superimposed and displayed on the image (first image) being displayed on the display 3. When the user pushes the monitor button 402 again, the sub-window 401 is hided. It should be noted that even if the user does not push the monitor button 402, for example, the sub-window 401 may be displayed on the display 3 when the video superimposition unit 28 detects connection of the cable 10a2. In this case, detecting the image signal is the display request.

With reference to FIG. 20, an example of an image displayed by the teleconference terminal 7 will be described. In FIG. 20, the teleconference terminal 7a and the teleconference terminal 7b are connected via a communication management system 500. The communication management system 500 is a call control server that performs call control for the teleconference terminals 7a and 7b. The communication management system 500 performs communication connection between the teleconference terminal 7a and the teleconference terminal 7b. A display 130aa is connected to the teleconference terminal 7a and a display 130db is connected to the teleconference terminal 7b.

The teleconference terminal 7b films an area around the teleconference terminal 7b including such as a user db, and transmits the filmed image data to the teleconference terminal 7a. Similarly, the teleconference terminal 7a films an area around the teleconference terminal 7a including such as a user aa, and transmits the filmed image data to the teleconference terminal 7b. Further, the teleconference terminal 7a synthesizes the image filmed by the teleconference terminal 7a itself and the image received from the teleconference terminal 7b to create a single image, and displays the single image on the display 130aa. The teleconference terminal 7b creates and displays the single image similarly. Although the image is mostly video, the image may be a still image. Further, sound (sound data) can be transmitted and received between the teleconference terminal 7a and the teleconference terminal 7b.

In this way, the user aa and the user bb, who is present in an area remote from an area where the user aa is present, can perform a teleconference while confirming a situation of the communication partner with each other. It should be noted that in the following, when the display 130aa and the 130db are not distinguished, it is referred to as the "display 130", and when the teleconference terminal 7a and the teleconference terminal 7b are not distinguished, it is referred to as the "teleconference terminal 7", An image displayed on the display 130 is an image displayed on the sub-window 401 of the electronic whiteboard 2. In a case in which the teleconference terminal 7 is connected to the electronic whiteboard 2, the video superimposition unit 28 displays, on the sub-window 401, the image being displayed on the display 130 by the teleconference terminal 7. The user can confirm the situation of the conference partner who is present in the remote area by viewing the display 3. It should be noted that whether the user can connect the teleconference terminal 7 to both the display 130 and the electronic whiteboard 2 at the same time depends on the specifications (configuration) of the teleconference terminal 7. However, even when the teleconference terminal 7 is connected to both the display 130 and the electronic whiteboard 2, the user can confirm the situation of the conference partner, who is in the remote area, by viewing the display 3 with a less visual line movement (movement of eyes) than viewing the display 130.

It should be noted that a device connected to the electronic whiteboard 2 via the cable 10a2 is not limited to the teleconference terminal 7. For example, an external device for displaying the image such as the notebook PC6 may be connected. If a device that outputs the image (image data) via the cable 10a2 is connected, the electronic whiteboard 2 can display the image on the sub-window 401.

«Inconvenience when Displaying the Sub-Window»

However, in a case in which the electronic whiteboard 2 displays the sub-window 401 on the display 3, it is required that the display controller 113 holds (stores), in a memory of the display controller 11, image data read from a video memory included in the GPU 112 and image data received from the teleconference terminal 7. When it is reported, from the CPU 101 or the like, that the monitor button 402 is pushed, the display controller 113 allocates a predetermined memory area for the teleconference terminal 7. As a result, a memory area for storing the image data in which UI image (A), the stroke image (B), and the output image (C) are superimposed (or image data in which UI image (A), the stroke image (B), and the background image (D) are superimposed) is decreased. In order to display the image data on the display 3 with a small memory area, the display controller 113 automatically converts color space from the YUV444 to the YUV422.

Here, "Y" of the YUV represents luminance, and "U" and "V" represent color difference. The YUV444 represents the YUV of one pixel with 24 bits (sum of respective 8 bits). On the other hand, the YUV422 represents the Y of one pixel with 8 bits, and represents the U and the V of two pixels with 8 bits respectively (the average bit number required for displaying one pixel is 16 bits). Thus, gradation which the YUV422 is able to display is less than gradation which the YUV444 is able to display, and it looks like contrast is decreased for the user's eyes. When the contrast is decreased, a guide line drawn with a pale color, a grid line, a short line, a small point or the like becomes difficult to be viewed (lack of information occurs in the display contents).

It should be noted that the guide line and the grid line are lines (lines for grasping handwriting positions) that are indications of a horizontal direction and a vertical direction for the user to write letters or the like by hand. In the following, becoming difficult to view the guide line, the grid line, the short line, the small point or the like may be referred to as decrease of visibility.

Further, although an example, in which the guide line drawn with the pale color, the grid line, the short line, or the small point becomes difficult for the user to view, is described in the embodiment, contents (handwritten object) in which the visibility is decreased are not limited to this.

«Process when Displaying the Sub-Window»

Thus, in a first example of the embodiment, in a case in which the color space of the display 3 is changed, decrease of the visibility is prevented by changing the contrast as follows. In other words, when the sub-window 401 is superimposed and displayed on the image being displayed on the display 3, the display mode is changed to a display mode for preventing a lack of information caused by the change of the color space. Changing the contrast is an example of a change of a display mode (mode for displaying the image).

First, as shown in FIG. 3, the background generation unit 34 includes the contrast value storage unit 34a. The contrast value storage unit 34a stores the following contrast table.

TABLE 1

| SUB-WINDOW IS ABSENT | CONTRAST VALUE A |
|---|---|
| SUB-WINDOW IS PRESENT | CONTRAST VALUE B |

In the contrast table, contrast values A and B are registered in association with the presence or the absence of the sub-window 401. The contrast value A corresponding to the absence of the sub-window 401 is a contrast value for clearly displaying an image of the display 3 in the color space of the YUV444. In other words, the contrast value A is used when the sub-window 401 is absent. The contrast value (first contrast value) A may be a initial value that has been set when the electronic whiteboard 2 has been shipped (in other words, the initial value has been set in advance) or a value set by the user determining it appropriate.

The contrast value (second contrast value) B corresponding to the presence of the sub-window 401 is a contrast value for clearly displaying a guide line drawn with a pale color, a grid line, a short line, a small point or the like in the color space of the YUV422. In other words, the second contrast value B, which is different from the contrast value A, is used when the sub-window 401 is present (the sub-window 401 is superimposed and displayed on the image being displayed on the display 3). The contrast value B has been set when the electronic whiteboard 2 has been shipped. In other words, the contrast value B has been set in advance. However, the contrast value B may be adjustable by the user or a service man after the electronic whiteboard 2 is shipped.

The greater the contrast value is, the greater a ratio of the maximum luminance/the minimum luminance is. This indicates that a screen looks bright when the contrast value is large. However, when the contrast is high, the screen becomes difficult to be viewed because pixels having low density are erased (influenced) by ambient light. Thus, in order to make the pixels having the low density easy to view, it is required to lower the contrast. For this reason, in many cases, the contrast value B is less than the contrast value A. However, because the user may set the contrast value A smaller and the contrast value B is an adjustable value, it is not necessarily true that "the contrast value B is less than the contrast value A". In other words, the contrast value B may be greater than the contrast value A in some cases.

By switching the contrast value to the contrast value B by the background generation unit 34 in a case in which the sub-window 401 is displayed on the electronic whiteboard 2 (displayed in color space having low gradation), the decrease of the visibility can be prevented even if the sub-window 401 is displayed.

<Operation Procedure for Switching the Contrast Value>

FIG. 21 is a flowchart illustrating an example of procedures for switching the contrast value. The procedures shown in FIG. 21 start in response to an event in which the monitor button 402 is pushed or the electronic whiteboard 2 is started.

First, a variable used for control in FIG. 21 will be described. In general, a range of the user-settable contrast value for the display 3 has a limit. For example, there is a case in which the contrast value can be set within a range from 0 to 100, within a range from −100 to +100, or within a range from −50 to +50. In the first example, a value that can be taken by the contrast value or a value that cannot be taken by the contrast value is set in a variable for controlling the contrast value. This variable (in the following, referred to as the control value) indicates a state of whether the sub-window 401 is being displayed when the monitor button 402 is pushed. The contrast value for the display 3 is switched between the contrast value A and the contrast value B based on the value held by the variable.

Next, in the display 3 of the first example, the contrast value can be set within a range from "0 to 100", for example. That is, the contrast value for the display 3 does not become a negative value. Further, the control value is initialized when the electronic whiteboard 2 is started. For example, the control value is set as −1. However, the control value set this time is not limited to −1 as long as it is a negative value. This is for displaying the image with the contrast value A, which corresponds to the absence of the sub-window 401, even when the electronic whiteboard 2 is restarted in a state in which the sub-window 401 is displayed (described later with reference to FIG. 21). Further, when being started, the contrast value A is set in the display controller 113.

Procedures shown in FIG. 21 will be described. In the following, the background generation unit 34, which generates a grid such as the background image (D), performs control. However, any of units of the display 30 or the video superimposition unit 28 may perform the control.

In step S10, the background generation unit 34 determines whether the control value is equal to or greater than 0. First, a case will be described assuming that the control value is −1. When the control value is −1, the sub-window 401 is not being displayed on the display 3 at present.

In a case in which the background generation unit 34 determines that the control value is not equal to or greater than 0 (No in step S10), the background generation unit 34 determines whether the monitor button 402 is turned ON (pushed) or not being turned ON in step S20.

In a case in which the background generation unit 34 determines that the monitor button 402 is not turned ON (No in step S20), the process returns to step S10 because the sub-window 401 is not to be displayed.

In a case in which the background generation unit 34 determines that the monitor button 402 is turned ON (Yes in step S20), the background generation unit 34 acquires the current contrast value from the display controller 113 in step S30 because the user performs an operation for displaying the sub-window 401. Then, the background generation unit 34 stores the acquired contrast value in the contrast table as the contrast value A. It should be noted that the contrast value stored at this time is to be used next time the contrast value is switched to the contrast value A.

Next, the background generation unit 34 reads the contrast value B from the contrast table, and sets the read contrast value B in the display controller 113 in step S40. In this way, the visibility can be prevented from being decreased even the sub-window 401 is displayed on the display 3.

Further, for control, the background generation unit 34 sets the contrast value acquired in step S30 as the control value in step S50. In the first example, the control value set in step S50 is necessarily a positive value. Accordingly, the control value set in step S50 is not limited to the contrast value acquired in step S30 as long as the control value is a positive value. Because the process returns to step S10, the process is described again from step S10. When the positive value is set as the control value, the background generation unit 34 determines that the control value is equal to or greater than 0 (Yes in step S10).

Next, the background generation unit 34 determines whether the monitor button 402 is turned OFF or not being turned OFF in step S60.

In a case in which the background generation unit 34 determines that the monitor button 402 is not turned OFF (No in step S60), the process returns to step S10 while the sub-window 401 is being displayed. That is, the sub-window 401 is displayed with the contrast value B continuously.

In a case in which the background generation unit 34 determines that the monitor button 402 is turned OFF (Yes in step S60), the background generation unit 34 reads the contrast value A from the contrast table, and sets the read contrast value A in the display controller 113 in step S70 because the user performs an operation for hiding the sub-window 401. In this way the display 3 is displayed with the contrast value A set by the user.

Next, for control, the background generation unit 34 sets −1 as the control value in step S80. After that, the process returns to step S10, then, steps S10 to S50 are executed because the control value is a negative value (−1). After that, the process is executed repeatedly.

As described above, the electronic whiteboard 2 according to the first example switches (changes) the contrast value, based on whether the sub-window 401 is to be displayed, in order to prevent the guide line, the grid line, the short line, the small point or the like from becoming difficult to be viewed.

It should be noted although the contrast value B has been previously set in the contrast table in the first example of the embodiment, the present invention is not limited to this. The background generation unit 34 may calculate the contrast value B. For example, the contrast value B can be set as a value less than the contrast value A. Further, the background generation unit 34 may decrease the contrast by calculating a value that is M % of the contrast value A. For example, M may be 80 to 90. M may be set as appropriate. Alternatively, the background generation unit 34 may change M based on a luminance value. The higher the luminance value is, the more difficult it is to view the grid line or the like when the sub-window 401 is displayed. Accordingly, the higher the luminance value is, the smaller M, used by the background generation unit 34 for calculating the contrast value B, is.

It should be noted that the visibility of the background image (D) is mainly described in the first example. However, because the contrast of the display 3 is changed when the color space is changed, decrease of visibility of the UI image (A), the stroke image (B), and the output image (C) can also be prevented. Accordingly, even if the guide line, the grid line, the short line, the small point or the like is displayed in the UI image (A), the stroke image (B), and the output image (C), the images can be displayed under a state easy to view for the user.

Second Example

In a second example of the embodiment, the electronic whiteboard 2 makes density of the background image (D) higher in order to prevent the decrease of the visibility when the sub-window 401 is displayed. Making the density of lines and/or points higher is an example of the change of the display mode.

FIG. 22 is a block diagram illustrating a functional configuration of the electronic whiteboard 2 according to the second example of the embodiment. It should be noted that elements of the second example having the same reference signs as the elements of the first example serve similarly. Thus, their descriptions may be omitted as appropriate.

In the electronic whiteboard 2 of the second example, the background generation unit 34 includes a density value storage unit 34*b*. The density value storage unit 34*b* stores the following density table.

TABLE 2

| SUB-WINDOW IS ABSENT | DENSITY VALUE A |
|---|---|
| SUB-WINDOW IS PRESENT | DENSITY VALUE B |

In the density table, density values A and B are registered in association with the presence or the absence of the sub-window 401. The density value A corresponding to the absence of the sub-window 401 is a density value (example of a first setting value) for displaying the background image (D) in the color space of the YUV444. The density value B corresponding to the presence of the sub-window 401 is a density value (example of a second setting value) for displaying the background image (D) in the color space of the YUV422. The density values A and B are initial values that have been set in advance when the electronic whiteboard 2 has been shipped or values set by the user determining them appropriate.

The density value B is a density value for displaying, under a state easy to view, the grid line drawn with a pale color or the small point in the color space of the YUV422. For example, a case is described in which a grid line of the background image (D) is a gray color. When RGB values of the density value A are (128, 128, 128), RGB values of the density value B are (100, 100, 100). That is, when the density value B is used, the grid line of the background image (D) is displayed deeply with the same gray color.

In the second example of the embodiment, by switching the density value to the density value B by the background generation unit 34 in a case in which the sub-window 401 is displayed on the electronic whiteboard 2 (displayed in the color space of the YUV422), the visibility can be prevented from being decreased even if the sub-window 401 is displayed.

<Operation Procedure for Switching the Density Value>

FIG. 23 is a flowchart illustrating an example of procedures for switching the density value. In FIG. 23, steps different from the steps shown in FIG. 21 will be mainly described. In the second example, the control value is used for a variable. Similar to the first example, −1 or a positive value is set as the control value.

First, in step S10, the background generation unit 34 determines whether a control value is equal to or greater than 0. A case will be described assuming that the control value is −1. When the control value is −1, the sub-window 401 is not being displayed on the display 3 at present.

In a case in which the background generation unit 34 determines that the control value is not equal to or greater than 0 (No in step S10), the background generation unit 34 determines whether the monitor button 402 is turned ON (pushed) or not being turned ON in step S20.

In a case in which the background generation unit 34 determines that the monitor button 402 is turned ON (Yes in step S20), the background generation unit 34 acquires the density value B from the density value table to generate the background image (D) in step S40'. In this way, the grid line drawn with the pale color and the small point can be displayed deeply even the sub-window 401 is displayed on the display 3.

Further, for control, the background generation unit 34 sets a positive value as the control value in step S50'. The background generation unit 34 may set the density value A.

Because the process returns to step S10, the process is described again from step S10. When the positive value is set as the control value, the background generation unit 34 determines that the control value is equal to or greater than 0 (Yes in step S10).

Next, the background generation unit 34 determines whether the monitor button 402 is turned OFF or not being turned OFF in step S60.

In a case in which the background generation unit 34 determines that the monitor button 402 is not turned OFF (No in step S60), the process returns to step S10 while the sub-window 401 is being displayed. That is, the background image (D) is drawn with the density value B continuously and the sub-window 401 is displayed.

In a case in which the background generation unit 34 determines that the monitor button 402 is turned OFF (Yes in step S60), the background generation unit 34 reads the density value A from the density value table to generate the background image (D) in step S70'.

Next, for control, the background generation unit 34 sets −1 as the control value in step S80. After that, the process returns to step S10, then, steps S10 to S50' are executed because the control value is a negative value (−1). After that, the process is executed repeatedly.

As described above, the electronic whiteboard 2 according to the second example switches (changes) the density value of the background image (D), based on whether the sub-window 401 is to be displayed, in order to prevent the guide line, the grid line, the short line, the small point or the like from becoming difficult to be view.

It should be noted that although the visibility of the background image (D) is described in the second example, regarding the UI image (A) generated by the UI image generation unit 33, a menu drawn with a pale color may be displayed deeply. Regarding the stroke image (B), because a stroke is drawn with a thick line and color having sufficient visibility, the likelihood that the visibility is decreased when the sub-window 401 is displayed is low. Even if the visibility is decreased, the stroke process unit 32 can make the density of color of the stroke higher. Regarding the output image (C), because the notebook PC 6 transmits the output image (C), a request is made to the notebook PC for making the density higher (or a request may be made for decreasing the contrast). In this way, even if the guide line, the grid line, the short line, the small point or the like is displayed in the output image (C), the image is displayed under a state easy to view.

Further, although the density is made higher with the same gray color in a case in which the sub-window 401 is to be displayed in the second example, the background generation unit 34 may change the color of the background image (D). For example, in a case in which a gray grid line or the like is being drawn in white background in the background image (D), the grid line or the like becomes easy to be viewed by making a value of R (red) and/or a value of B (blue) greater. Accordingly, it is effective to change the color by changing the ratio of RGB. The UI image (A), the stroke image (B), and the output image (C) can be processed (displayed) similarly.

Further, the background generation unit 34 may make a line or the like drawn in the background image (D) thicker. The grid line or the like becomes easy to be viewed by making the line thicker even when the same color or the same density is used. The UI image (A), the stroke image (B), and the output image (C) can be processed (displayed) similarly.

Further, at least one of the density (denseness), the color, and the thickness of the background image (D) may be changed when the sub-window 401 is to be displayed. Further, in combination with the change of the contrast described in the first example, at least one of the density (denseness), the color, and the thickness may be changed. In other words, in the embodiment, a setting value relating to at least one of the contrast value, the image density of the image, the color of the image, and the thickness of the image may be changed based on whether the sub-window 401 is superimposed and displayed on the image (first image) being displayed on the display 3.

Another Example

Further, the present invention is not limited to these embodiments, but various variations and modifications may be made without departing from the scope of the present invention.

In the embodiment, it is described that the color space is changed due to the decrease of the memory capacity of the display controller 113. However, the embodiment can be applied to a case in which the color space is changed due to the decrease of a memory capacity of a unit other than the display controller 113. Further, the display controller 113 may be referred to as a LCD controller, and the name is not limited.

Further, although the YUV444 and the YUV422 are described as examples of the color spaces of the display 3 in the embodiment, the color space for the display 3 is not limited to these. For example, some embodiments may change the YUV444 to the YUV420 or the YUV411. Further, some embodiments may change the YUV422 to the YUV420 or the YUV411.

That is, the embodiment can be applied to two of the color space YUV444, the color space YUV422, the color space YUV420, and the color space YUV411 for preventing a lack of information caused relatively in the image.

Further, YCbCr may be used as the color space of the display 3 instead of the YUV. Further, in a case in which the video superimposition unit 28 transmits RGB signals to the display 3 without converting the RGB into the YUV, color space of the RGB system may be used.

The present application is based on and claims the benefit of priority of Japanese Priority Application No. 2015-090237 filed on Apr. 27, 2015, with the Japanese Patent Office, the entire contents of which are hereby incorporated by reference.

REFERENCE SIGNS LIST 1 image processing system
2 electronic whiteboard
3 display
4 electronic pen
6 notebook PC
7 teleconference terminal
9 communication network
28 video superimposition unit
30 image processing unit
32 stroke process unit
33 UI image generation unit
34 background generation unit
34a contrast value storage unit
34b density value storage unit
401 sub-window
402 monitor button

The invention claimed is:

1. An information processing apparatus for displaying a first image on a display apparatus, the information processing apparatus comprising:
a display request detection unit configured to detect a display request to the display apparatus for displaying a second image that is different from the first image;
an image acquisition unit configured to acquire an image signal of the second image from an outside;
a superimposition display unit configured to superimpose and display the second image, formed by using the image signal, on the first image in a case in which the display request detection unit detects the display request; and
a display mode changing unit configured to change, in a case in which the second image is superimposed and displayed on the first image, a display mode for the display apparatus,
wherein the display mode changing unit sets a second contrast value for the display apparatus to change the display mode in the case in which the second image is superimposed and displayed on the first image,
wherein the display mode changing unit sets a first contrast value, different from the second contrast value, for the display apparatus to change the display mode in a case in which the second image is not displayed on the display apparatus,
wherein the superimposition display unit uses the second contrast value to display both the second image and the first image on the display apparatus in the case in which the second image is superimposed and displayed on the first image, and
wherein the superimposition display unit uses the first contrast value to display the first image on the display apparatus in the case in which the second image is not displayed on the display apparatus.

2. The information processing apparatus according to claim 1,
wherein the display mode changing unit is configured to change, in the case in which the second image is superimposed and displayed on the first image, the display mode to a display mode for preventing a lack of information caused in the first image by superimposing and displaying the second image on the first image, and
wherein the superimposition display unit is configured to display the first image with the display mode for preventing the lack of the information changed by the display mode changing unit.

3. The information processing apparatus according to claim 2,
wherein the display mode changing unit is configured to change, in the case in which the second image is superimposed and displayed on the first image, the display mode to a display mode for preventing the lack of the information caused by a change of color space of the display apparatus, and wherein the superimposition display unit is configured to display the first image with the display mode, changed by the display mode changing unit, for preventing the lack of the information caused by the change of the color space of the display apparatus.

4. The information processing apparatus according to claim 1, wherein the display mode changing unit is configured to set a second setting value relating to at least one of image density of the first image, a thickness of the first image, and a color of the first image in the case in which the second image is superimposed and displayed on the first image, the second setting value being different from a first setting value, relating to the at least one of the density of the first image, the thickness of the first image, and the color of the first image, used in a case in which only the first image is displayed on the display apparatus, and wherein the superimposition display unit is configured to superimpose and display, on the display apparatus, the second image on the first image generated with the second setting value.

5. The information processing apparatus according to claim 1, wherein the display mode changing unit is configured to switch the display mode between a first display mode, in which only the first image is displayed on the display apparatus, and a second display mode, in which the second image is superimposed and displayed on the first image, based on a value held by a variable.

6. The information processing apparatus according to claim 5, wherein the display mode changing unit is configured to store the first display mode in a case in which the display mode is switched from the first display mode to the second display mode wherein in a case in which the display mode is switched from the second display mode to the first display mode, the display mode changing unit is configured to acquire the first display mode stored by the display mode changing unit, and wherein the superimposition display unit is configured to display, on the display apparatus, the first image with the first display mode acquired by the display mode changing unit.

7. The information processing apparatus according to claim 1, wherein the display request detection unit is configured to detect the display request to the display apparatus for displaying the second image based on an operation to an operation receiving unit arranged on the information processing apparatus.

8. The information processing apparatus according to claim 1, further comprising:

a stroke image generation unit configured to detect handwriting positions on a display surface of the display apparatus to generate a stroke image by connecting the handwriting positions;

wherein a line or a point that is an indication of the handwriting positions is drawn in the first image, and wherein the display mode changing unit is configured to change the display mode to a display mode for preventing decrease of visibility of the line or the point in the case in which the second image is superimposed and displayed on the first image.

9. The information processing apparatus according to claim 1, wherein the second contrast value is less than the first contrast value.

10. The information processing apparatus according to claim 1, wherein the display mode changing unit switches a contrast of the display apparatus between the first contrast value and the second contrast value when color space of the display apparatus is changed.

11. The information processing apparatus according to claim 10, wherein the color space of the display apparatus is converted from YUV 444 to YUV 422 in the case in which the second image is superimposed and displayed on the first image.

12. The information processing apparatus according to claim 1, wherein the second image is a sub-window.

13. An image displaying method performed by an information processing apparatus for displaying a first image on a display apparatus, the image displaying method comprising:

a display request detection step of detecting a display request to the display apparatus for displaying a second image that is different from the first image;

an image acquisition step of acquiring an image signal of the second image from an outside;

a superimposition display step of superimposing and displaying the second image, formed by using the image signal, on the first image in a case in which the display request is detected in the display request detection step; and a display mode changing step of changing, in a case in which the second image is superimposed and displayed on the first image, a display mode for the display apparatus, wherein a second contrast value for the display apparatus is set to change the display mode in the display mode changing step in the case in which the second image is superimposed and displayed on the first image, wherein a first contrast value, different from the second contrast value, for the display apparatus is set to change the display mode in the display mode changing step in a case in which the second image is not displayed on the display apparatus, wherein the second contrast value is used to display both the second mage and the first image on the display apparatus in the superimposition display step in the case in which the second image is superimposed and displayed on the first image, and wherein the first contrast value is used to display the first image on the display apparatus in the superimposition display step in the case in which the second image is not displayed on the display apparatus.

* * * * *